(12) United States Patent
Hazen et al.

(10) Patent No.: US 11,708,258 B2
(45) Date of Patent: Jul. 25, 2023

(54) BEVERAGE PRODUCT AMENDMENT APPARATUS AND METHOD OF USE THEREOF

(71) Applicants: Gavin Hazen, Gilbert, AZ (US); Kevin H. Hazen, Flagstaff, AZ (US); Alton J. Reich, Huntsville, AL (US); Michael Roth, Scottsdale, AZ (US)

(72) Inventors: Gavin Hazen, Gilbert, AZ (US); Kevin H. Hazen, Flagstaff, AZ (US); Alton J. Reich, Huntsville, AL (US); Michael Roth, Scottsdale, AZ (US)

( * ) Notice: Subject to any disclaimer, the term of this patent is extended or adjusted under 35 U.S.C. 154(b) by 72 days.

(21) Appl. No.: 17/120,135

(22) Filed: Dec. 12, 2020

(65) Prior Publication Data

US 2022/0127122 A1 Apr. 28, 2022

Related U.S. Application Data

(63) Continuation-in-part of application No. 17/115,640, filed on Dec. 8, 2020, which is a continuation-in-part of application No. 17/111,366, filed on Dec. 3, 2020.

(60) Provisional application No. 63/105,261, filed on Oct. 24, 2020.

(51) Int. Cl.
*B67C 3/02* (2006.01)
*A23L 33/105* (2016.01)
(Continued)

(52) U.S. Cl.
CPC ............ *B67C 3/023* (2013.01); *A23D 7/0053* (2013.01); *A23D 7/04* (2013.01); *A23L 2/52* (2013.01);
(Continued)

(58) Field of Classification Search
CPC .. B67C 3/02; B67C 3/023; B67C 3/20; B67C 3/208; B67C 7/00; A23D 7/0053;
(Continued)

(56) References Cited

U.S. PATENT DOCUMENTS

2008/0237235 A1* 10/2008 Morabito ............... B65D 39/08
220/288
2009/0032531 A1* 2/2009 Navare .............. B65D 17/4014
220/254.1
(Continued)

FOREIGN PATENT DOCUMENTS

EP 3400807 A1 * 11/2018
WO WO-2016124522 A1 * 8/2016
(Continued)

OTHER PUBLICATIONS

Cannonborough; "How It's Made"; Jul. 15, 2019 https://web.archive.org/web/20190715234137/https://www.cannonbevco.com/how-its-made (Year: 2019).*

(Continued)

*Primary Examiner* — Drew E Becker
*Assistant Examiner* — Austin Parker Taylor
(74) *Attorney, Agent, or Firm* — Kevin H. Hazen; Hazen Patent Group, LLC

(57) ABSTRACT

The invention comprises a method and apparatus for amending a food product, comprising the steps of: (1) receiving into a second geographic zone the food product from a first geographic zone, where packaging greater than five milligrams per serving of tetrahydrocannabinol (THC) in the food product is illegal in the first geographic zone and legal in the second geographic zone; (2) forming a composition of the tetrahydrocannabinol comprising a viscosity of less than 2,000 mPa sec; and (3) injecting the food product with the composition of the tetrahydrocannabinol to form an amended food product, where the composition preferably comprises an emulsion of tetrahydrocannabinol, an emulsifier, and water with a mean particle size of less than 1000 nm and a viscosity of less than 100 mPa sec.

15 Claims, 17 Drawing Sheets

(51) Int. Cl.
*A23L 2/52* (2006.01)
*A23D 7/04* (2006.01)
*B67C 7/00* (2006.01)
*A23D 7/005* (2006.01)
*B65D 17/28* (2006.01)

(52) U.S. Cl.
CPC ........ *A23L 33/105* (2016.08); *B65D 17/4014* (2018.01); *B67C 7/00* (2013.01); *A23V 2002/00* (2013.01)

(58) Field of Classification Search
CPC ... A23D 7/04; A23L 2/52; A23L 33/10; A23L 33/105; A23L 33/115; A23V 2250/2132; A47J 31/00; A47J 31/002; A47J 31/007; A47J 31/40–404; A47J 31/41; A47J 31/46; C12G 2200/21; B65D 43/0235; B65D 43/22; B65D 43/24; B65D 17/4012; B65D 17/4014; C12C 5/02; C12C 5/026
USPC ........................................................ 426/590
See application file for complete search history.

(56) References Cited

U.S. PATENT DOCUMENTS

| | | | | |
|---|---|---|---|---|
| 2013/0067799 A1* | 3/2013 | Hassan | ................... | C11C 5/00 106/245 |
| 2013/0089600 A1* | 4/2013 | Winnicki | ................ | A61K 47/24 514/454 |
| 2015/0030748 A1* | 1/2015 | Schultz | ................... | A23L 29/25 426/590 |
| 2015/0210465 A1* | 7/2015 | Raad | ................... | B65D 47/122 220/592.16 |
| 2015/0327566 A1* | 11/2015 | Epiphani | ................ | A61K 8/922 426/573 |
| 2016/0219920 A1* | 8/2016 | Schaffner | .................. | A23L 2/70 |
| 2017/0027194 A1* | 2/2017 | Cha | .......................... | A23C 9/13 |
| 2017/0143011 A1* | 5/2017 | Ahtchi-Ali | ............. | A61K 47/44 |
| 2019/0015383 A1* | 1/2019 | Woelfel | ................ | A61K 31/05 |
| 2019/0037870 A1* | 2/2019 | Fries | ...................... | A23C 11/04 |
| 2019/0254325 A1* | 8/2019 | Munsell | ................. | A23G 3/48 |
| 2020/0172841 A1* | 6/2020 | Wilkes | ................. | A61K 9/1075 |
| 2020/0245666 A1* | 8/2020 | Spall | ......................... | A23L 2/52 |

FOREIGN PATENT DOCUMENTS

| | | | | |
|---|---|---|---|---|
| WO | WO-2019023803 A1 * | 2/2019 | ............... | A23G 1/48 |
| WO | WO-2020037410 A1 * | 2/2020 | ............... | A21D 2/36 |

OTHER PUBLICATIONS

Finfeed; "What happens when you mix cannabis with coke?"; Sep. 21, 2018 https://finfeed.com/opinion/the-420-report/what-happens-when-you-mix-cannabis-coke/ (Year: 2018).*

* cited by examiner

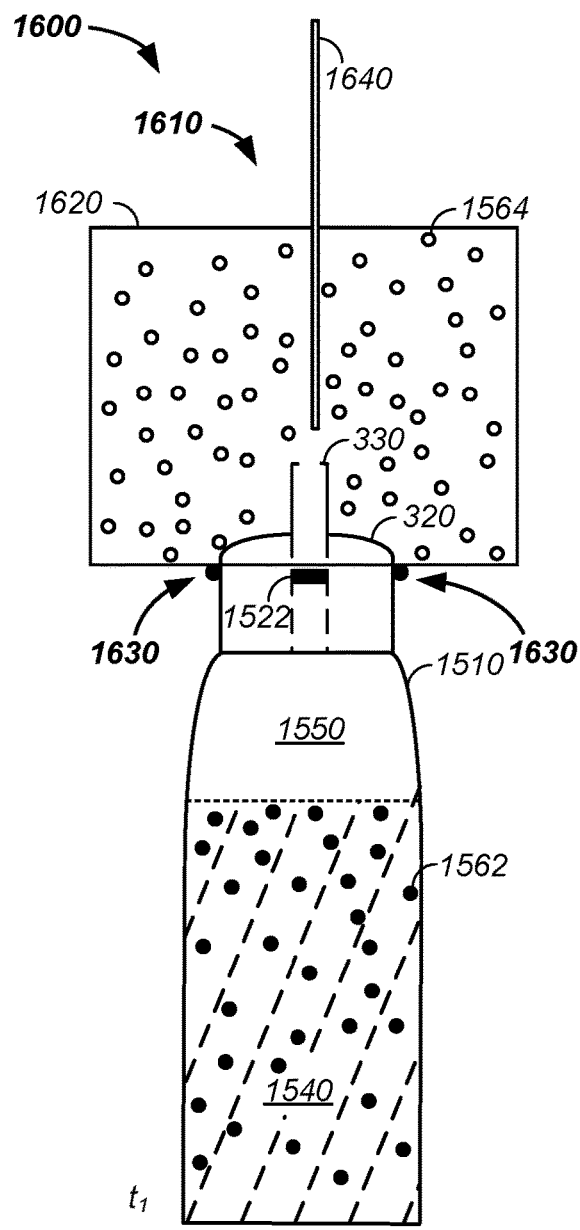 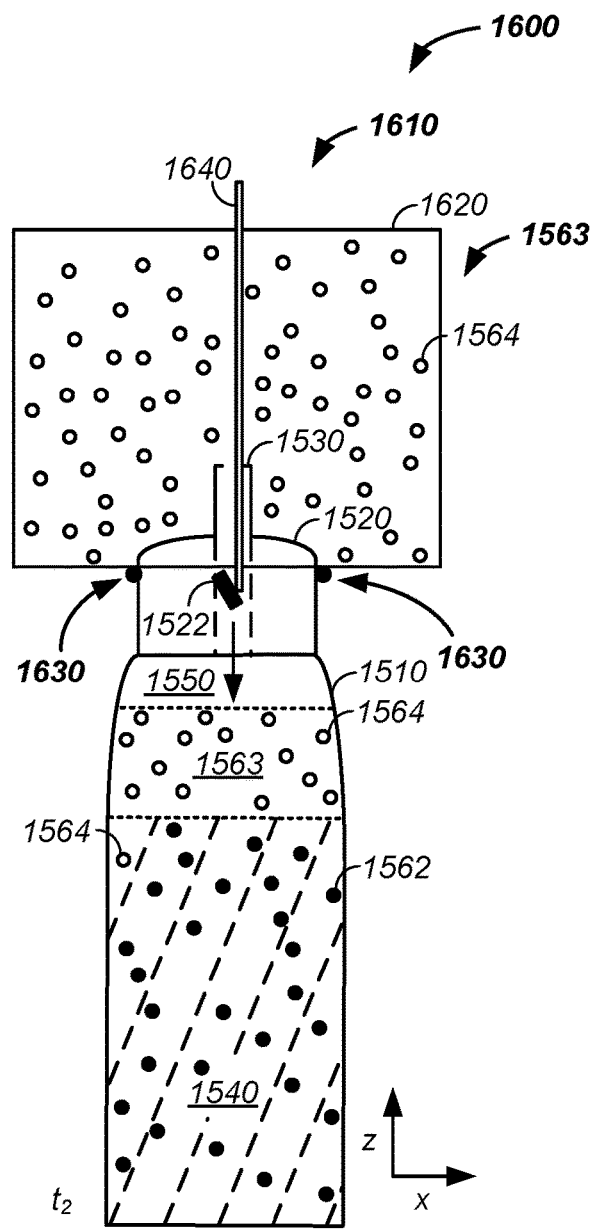
FIG. 16A  FIG. 16B

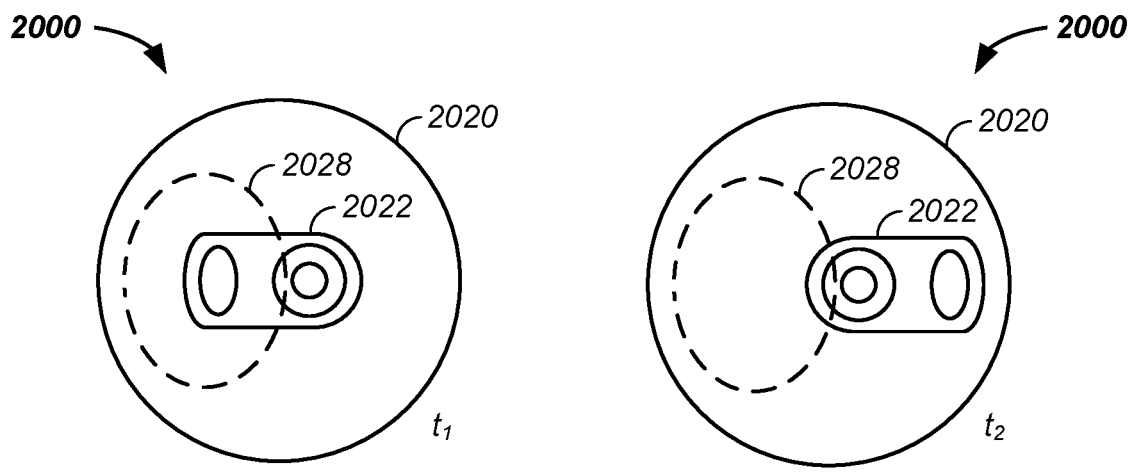
FIG. 24
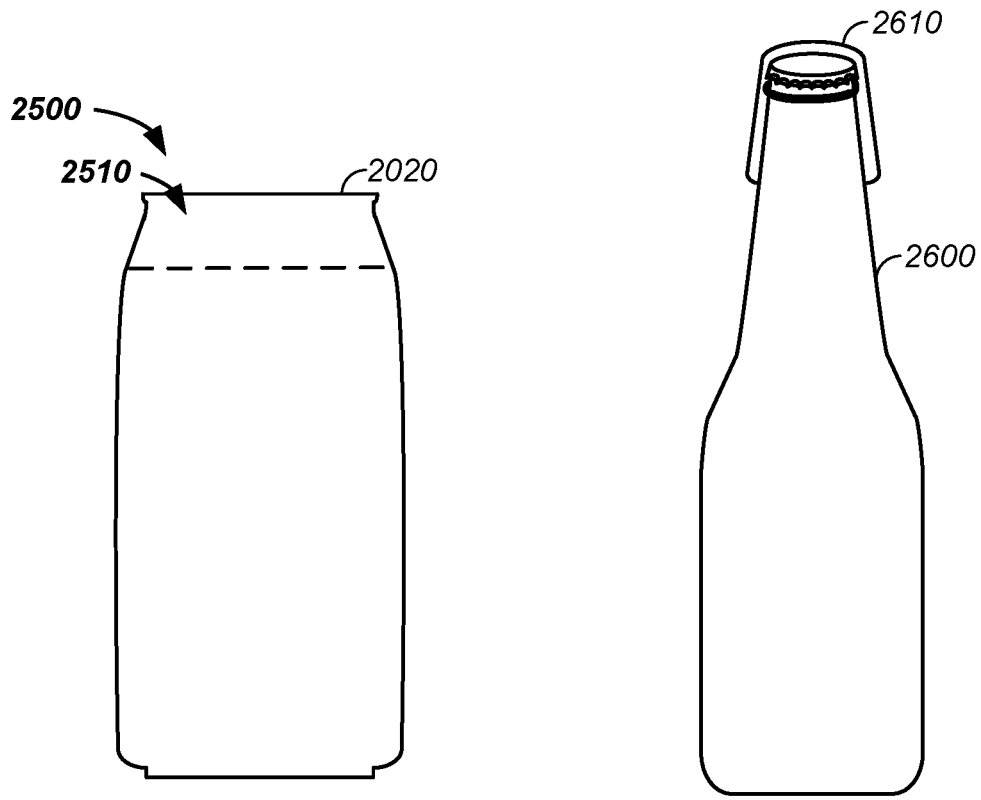
FIG. 25
FIG. 26

BEVERAGE PRODUCT AMENDMENT APPARATUS AND METHOD OF USE THEREOF

CROSS-REFERENCES TO RELATED APPLICATIONS

This application is a continuation-in-part of U.S. patent application Ser. No. 17/115,640 filed Dec. 8, 2020, which is a continuation-in-part of U.S. patent application Ser. No. 17/111,366 filed Dec. 3, 2020, which claims the benefit of U.S. provisional patent application No. 63/105,261 filed Oct. 24, 2020, all of which are incorporated herein in its entirety by this reference thereto.

BACKGROUND OF THE INVENTION

Field of the Invention

The present invention relates generally to re-packaging a food and/or a beverage component.

Discussion of the Related Art

Food products shipped across state lines do not legally contain tetrahydrocannabinol.

Statement of the Problem

No system exists for preparing a stable beverage containing tetrahydrocannabinol (THC) as THC falls out of an aqueous solution.

SUMMARY OF THE INVENTION

The invention comprises a method and apparatus for amending forming a stable beverage containing THC.

DESCRIPTION OF THE FIGURES

A more complete understanding of the present invention is derived by referring to the detailed description and claims when considered in connection with the Figures, wherein like reference numbers refer to similar items throughout the Figures.

FIG. 16A illustrates a packaged formulation and FIG. 16B illustrates an amended formulation

FIG. 24 illustrates a rotated can tab;

FIG. 25 illustrates an adult can safety label;

FIG. 26 illustrates an adult labeled bottle;

DETAILED DESCRIPTION OF THE INVENTION

Figure 1:
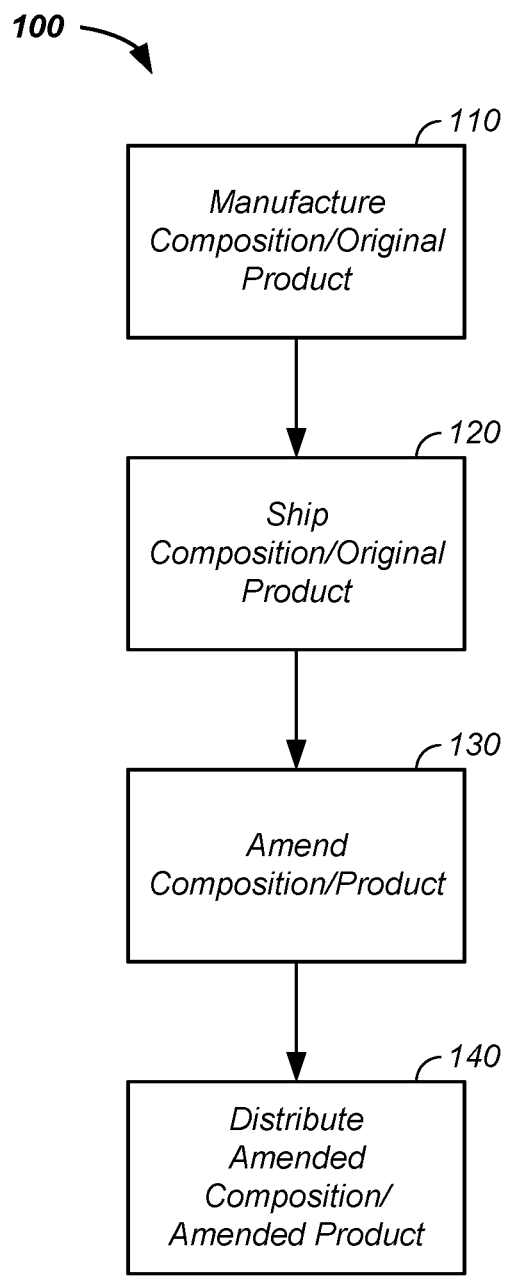
FIG. 1 illustrates a two-location product preparation system.

The invention comprises a method and apparatus for amending a food product, comprising the steps of: (1) receiving into a second geographic zone the food product from a first geographic zone, where packaging greater than five milligrams per serving of tetrahydrocannabinol (THC) in the food product is illegal in the first geographic zone and legal in the second geographic zone; (2) forming a composition of the tetrahydrocannabinol comprising a viscosity of less than 2,000 mPa sec; and (3) injecting the food product with the composition of the tetrahydrocannabinol to form an amended food product, where the composition preferably comprises an emulsion of tetrahydrocannabinol, an emulsifier, and water with a mean particle size of less than 1000 nm and a viscosity of less than 100 mPa sec.

Herein, a food product refers to a solid food, a drink, and/or a beverage. Optionally, the food product refers to a first component of a subsequent food product, where the first component of the food product is packaged and labeled for sale, such as a syrup of a beverage.

Herein, for clarity of presentation and without loss of generality, tetrahydrocannabinol (THC) is used to illustrate a component that is legal in a second location, such as a licensed THC facility, that is not legal in a first location, such as a manufacturing facility. More generally, many regulated components, formulations, and/or chemicals are legally packaged in a second location where the many regulated components, formulations, and/or chemical may not be legally packed at the first location or shipped from the first location to the second location.

Herein, for clarity of presentation and without loss of generality, a processed cheese sauce is illustrative of a manufactured formulation prepared at a first location, such as a main manufacturing facility that is amended, such as with the addition of tetrahydrocannabinol, at a second facility. Other products that are optionally manufactured at one facility and amended at a second facility include, but are not limited to: whipped cream, icing, cookie dough, or pancakes, where any of the products are optionally delivered from a pressurized canister. More generally, any food product prepared and packaged for sale at a first location is optionally amended, to form an amended food product, at a second location, such as a sweet, such as a chocolate, a savory item, such as a cheese puff, and/or a beverage, such as a soda.

Herein, an original food product is optionally packaged for sale in a pressurized container, such as a sprayable cheese product. For clarity of presentation and without loss of generality, examples are provided that amend the originally packaged sprayable cheese product to form an amended sprayable cheese product, such as containing THC. However, generally any originally packaged food/drink product is optionally amended, such as described herein, to form an amended food/drink product, such as an amended gummy, chip, pretzel, snack, candy, baked good, bagged food product, boxed food product, beverage, canned drink, and/or bottled drink.

Herein, for clarity of presentation and without loss of generality, a pressurized device includes, but is not limited to, a pressurized canister, an aerosol canister, a bag-in-can type canister, and/or a piston barrier system, which includes a canister with a product on a dispensing side of the piston and a pressurized gas on the opposite side of the piston. Typically, in an aerosol canister, the propellant is at least partially delivered with the product. Typically, dispensing product from the piston barrier system results in little to no co-dispensing of the pressurized gas until after the product is substantially dispensed, such as greater than 95% of the product has been dispensed.

Herein, an x/y-plane is perpendicular to a z-axis aligned with gravity.

Multiple Location Product Manufacturing

Generally, a food product is made at a first location, shipped, sold and/or is consumed/used at a second location. Typically, the first location is a manufacturing facility, such as in a first state and the sale location and/or point of consumption/use is at a retail facility or residence, such as in a second state. Some formulations do not ship well and/or are best shipped without certain elements in the formulation, such as a component legal in one location and illegal in a second location. For instance, THC placed into an original food product is not currently legally shipped across state lines in the United States of America. Hence, as described herein, an original food product is optionally sequentially: produced for sale in a first state, shipped across a state line into a state where THC in the food product is legal, amended with THC, and subsequently distributed for sale as an amended product.

Figure 8:
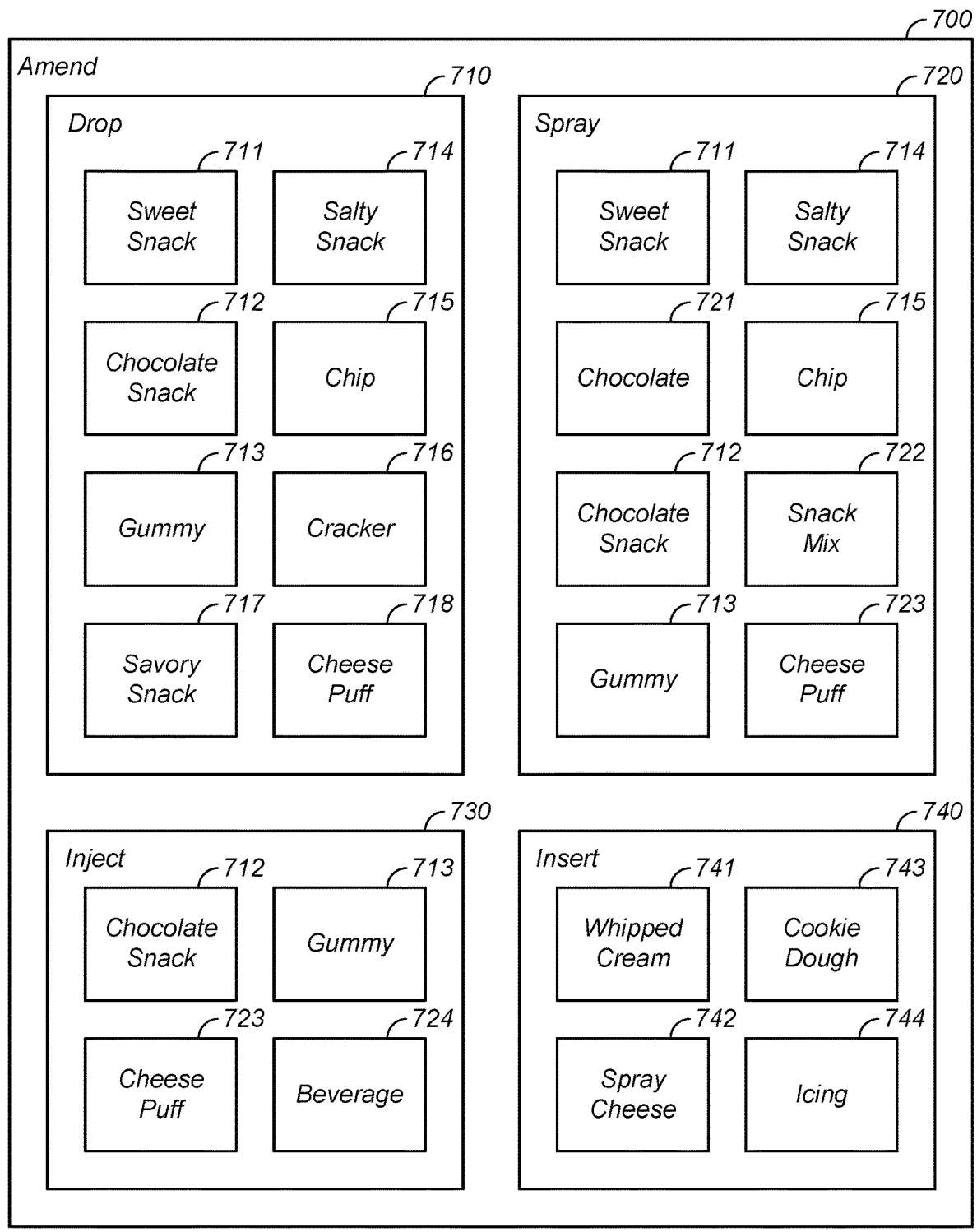
FIG. 8 further illustrates product amendment.

Referring now to FIG. 1 and referring now to FIG. 8, a multiple location product manufacturing system 100 is illustrated. Notably, the multiple location product manufacturing system 100 does not refer to a complete product being manufactured at a first location and the same complete project being manufactured at a second location. Rather, the multiple location product manufacturing system 100 refers to a sequence of processes described herein. In a first process, manufacture of a composition and/or a product 110 is performed at a first location to form an original product 112, such as a product for sale to an end consumer. Subsequently, in a second process, the composition and/or the original product 112 is shipped 120, such as across a state line, from a first legal jurisdiction to a second legal jurisdiction, from a location where THC is illegal to a location where THC is legal, to a regulated facility, and/or to a THC certified facility. After shipment, a third process of amending 130 the composition and/or amending the original product 112 is performed, such as an addition of THC to the original product 112 to form an amended product 114. The amendment process 130 optionally includes additional steps, such as the addition of a THC emulsion and/or opening of a pressure seal and/or inserting at least one composition element into a pressurized environment of the manufactured and shipped composition and/or the manufactured and shipped product. In a fourth process, the amended composition and/or the amended product, is shipped and/or distributed 140, such as for sale.

Example I

Still referring to FIG. 1, in a first example of the multiple location product manufacturing system 100, a process of amending the composition/product with at least one added constituent is further described. For clarity of presentation and without loss of generality, the added component in examples herein is THC. Optionally, the added component includes one or more of: THC, a hallucinogen, a psychedelic, a dissociate, a deliriant, and/or a designer drug, where the designer drug contains a structural and/or a functional analog of a controlled substance that has been designed to mimic the pharmacological effects of the original drug while at the same time avoiding being classified as illegal. Optionally, the added component includes a chemical, a class of chemicals, a molecule, a class of molecules, a compound, and/or a composition illegal in a first geographic zone, such as at a first manufacturing facility, and legal in a second geographic zone, such as at a product amendment facility. Optionally, the added component includes a mushroom and/or a nootropic, such as a vitamin, limonella, an extract of Eustis Limequat, an extract of a fruit, a portion of a peel of a fruit, a zest, a terpene, and/or niacin. In a first case, the manufactured and shipped product, such as the original product, is in a pressurized environment, such as in an aerosol canister or is packaged in a product side of a piston barrier in a container of a piston barrier system. In this first case, at the second location, the pressure barrier is optionally opened, such as to a higher pressure environment containing THC, THC is added to the aerosol canister which flows into the container as a result of the higher pressure in the THC additive environment, and the container is then resealed in preparation for distribution and/or sale. In a second case, the original product is shipped ready for sale in a first package. The package is opened, the contents are amended, and the amended contents are distributed for sale, such as in the original packaging or in new packaging.

Amendment Additives

Figure 2:
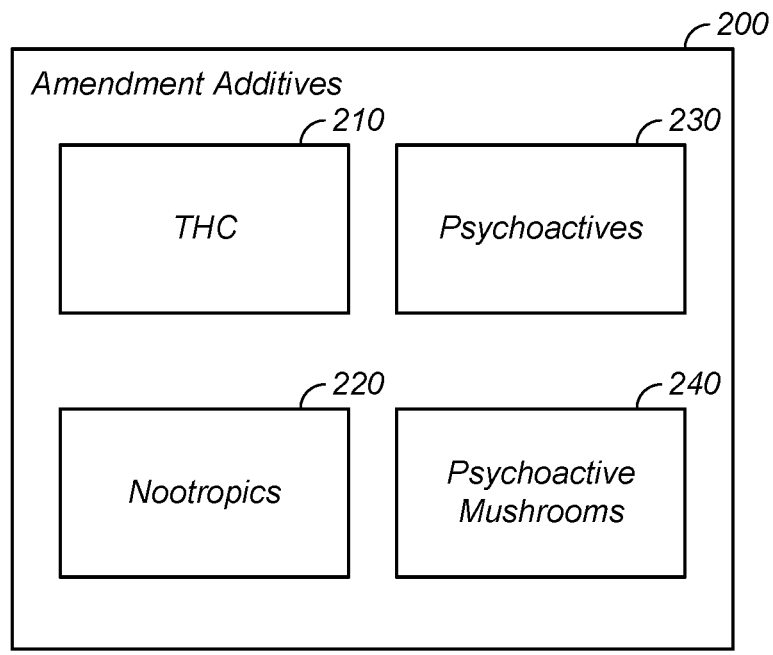
FIG. 2 illustrates amendment additives.
Figure 3:
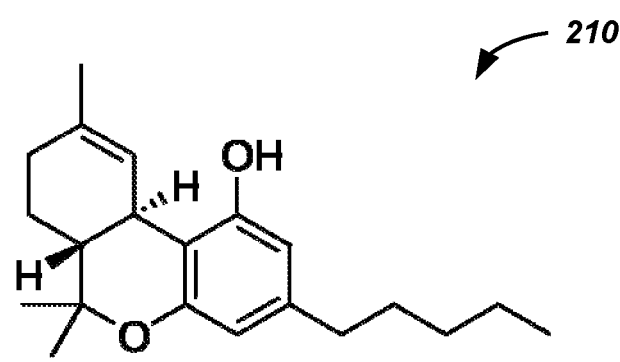
FIG. 3 illustrates, in two-dimensions, a molecular structure of tetrahydrocannabinol.

Referring still to FIG. 1 and referring now to FIGS. 2 and 3, generally the multiple location product manufacturing system 100 is used to amend the original product 112 with an additive 200. Optionally, the packaging of the original product 112 is amended, as further described infra. Herein, for clarity of presentation and without loss of generality, tetrahydrocannabinol 210 is used as an example of the additive 200. However, any additive 200 is optionally used in the step of amending the composition/product 130. For example, still referring to FIG. 2, the additive 200 is optionally a nootropic 320, such as any agent that makes you feel emotionally happier, stronger, and/or better. Herein, a nootropic is optionally any natural product, molecule, formulation, or mixture that is currently, as of the year 2020, legal in one or more states in the United States of America and is currently illegal in one or more other states America. A nootropic 220 is not necessarily science backed; however, many nootropics have known effects on the body. For instance, the additive 200, is optionally a psychoactive 230, such as a molecule, substance, or mixture, that affects the nervous system resulting in alterations in perception, mood, consciousness, cognition, or behavior. For example, psychoactive mushrooms 240 are currently legal in some states, such as Colorado. Additional examples of nootropics 220 include a depressant, a stimulant, MDMA, an anxiolytic, nicotine, a barbiturate, and/or a hallucinogen. Optionally, a nootropic is legal in all states. For instance, niacin is an example of a nootropic and ingestion of niacin results in a flush or warm feeling. Caffeine, an example of a stimulant nootropic, is another example of a nootropic, which is a neural system stimulant. Nootropics also include: melatonin, Gaba, 5-htp, L-theanine, Bacopa Monnieri, *Rhodiola Rosea, Panax Ginseng*, citicoline, L-Tyrosine, alpha GPC, Huperzine A, Bacopa Monnieri, phosphatidylserine, N-Acetyl-L-Tyrosine, mushroom, vitamin C in combination with mushrooms as vitamin-C increases bioavailability of mushrooms, Valerian root, omega 3s, Lion mane mushroom, *Cordyceps militaris* and *sinensis*, Reishi (*Ganoderma lucidum*), Chocolate (cocoa powder), caffeine, MCT oils, magnesium, Ashwagandha Root Extract, vitamin-D, carotenoids, algae amino acids, jellyfish extract, and/or terpenes. In addition, each of tryptophan, 5-htp, SAMe (S-adenosyl-L-methionine), St. John's wort, and probiotics increase serotonin production and/or function to modulate the serotonin pathway. One combination of nootropics is Gaba, Myrcene, and THC. Additional optional nootropics include:

1. 5-HTP for serotonin regulation;
2. Acetyl L-Carnitine to protect and power brain cells;
3. Alpha Lipoic Acid, an antioxidant for blood-brain barrier protection;
4. Alpha-GPC a phospholipid choline to support brain structure;
5. Aniracetam, a synthetic Russian racetam, for mood enhancement;
6. Apoaequorin, jellyfish protein for neuroprotective activity;
7. Artichoke supplies luteolin, for mental performance;
8. Ashwagandha for mental energy;
9. Astaxanthin a potent antioxidant found in algae and seafood;
10. Bacopa Monnieri for improved retention of knowledge;
11. Caffeine, not a true nootropic, but a stimulant;
12. California poppy interacts with GABA and HTP receptors for anxiety-soothing;
13. Cat's Claw for neuroprotective activity;
14. Catuaba, a traditional Brazilian bark herb, for neuroprotection;
15. CBD, a cannabis derived compound, to ease anxiety;
16. *Celastrus paniculatus*, woody shrub seeds, for brain health;
17. Centrophenoxine, a synthetic smart drug related to DMAE for enhanced cerebral vascular function;
18. Citicoline, a choline source, for brain energy and mood enhancement;
19. *Clitoria ternatea*, a traditional Asian herb, for memory enhancement;
20. Coluracetam, called MKC-231, a synthetic racetams for help with brain degeneration;
21. *Convolvulus* pluricaulis, an Indian tonic herb, aids learning;
22. CoQ10 helps powering brain cell mitochondria;
23. Creatine for charging muscles;
24. Choline for maintaining healthy brain structure;
25. DHA for early brain development;
26. DMAE, found in sardines, for mood enhancement;
27. Forskolin, active ingredients of *Coleus Forskohlii*, for regulation of cell-to-cell communication;
28. GABA, an inhibitory amino acid, settles nerves producing relaxation and a pleasant mood;
29. *Ginkgo biloba* for enhancing brain circulation;
30. Ginseng for countering stress;
31. Gotu Kola for blood vessel support;
32. Guarana to boost physical endurance;
33. Huperzine-A, a synthetic alkaloid, to help with degenerative brain concerns;
34. Kanna (*Sceletium tortuosum*) for help with mental performance;
35. Kava Kava, a psychoactive root to ease anxiety;
36. Kratom to promote feelings of calmness and positivity;
37. L-Glutamine for healthy cognition;
38. L-Phenylalanine for mood balance;
39. L-Theanine to promote wakeful relaxation;
40. L-Tryptophan for calm/relaxed moods;
41. Lecithin supplies for optimizing brain cell healthy structure;
42. Lemon Balm to promote calmness;
43. Lion's Mane Mushroom for brain plasticity;
44. Magnolia for relaxation;
45. MCT Oil for brain energy;
46. NADH for ATP energy production;
47. Nefiracetam, a synthetic racetam smart drug for memory;
48. Nicotine, not a nootropic, but has shown nootropic effects in the realm of brainpower;
49. Noopept, patented racetam;
50. Oatstraw for relaxed alertness;
51. Oxiracetam for focus;
52. Passionflower for relaxation;
53. Phenibut for mood;
54. Phenylpiracetam for cognitive function;
55. Phosphatidylcholine for brain regeneration;
56. Phosphatidylserine helps build, power, and protect brain cells;
57. Picamilon for anxiety;
58. Pine Bark Extract for attention;
59. Piracetam for stimulating, mood balancing effects;
60. Psychobiotics as beneficial flora in the GI tract can influence mood and cognitive function;
61. Pramiracetam for memory formation;
62. Pterostilbene for resistance to aging;
63. PQQ for the production of energy within brain cells;
64. Resveratrol, a red wine antioxidant for protecting brain cells against free radicals and inflammation;
65. *Rhodiola rosea* for mental energy and physical endurance;
66. Rosemary for age-related cognitive support;
67. SAMe for mood balance;
68. Schizandrol-A for anti-stress;
69. St. John's Wort for helping with depression;
70. Sulbutiamine for brain health;
71. Taurine for nerve-calming effects;
72. Theobromine for stimulating properties;
73. Turmeric for cognitive health;
74. Tyrosine for mental performance in distracting, multitasking settings;
75. Uridine for brain regeneration;
76. Valerian for sustaining GABA levels to promote relaxation;
77. Vinpocetine, a synthetic form of periwinkle, for brain circulation;
78. Vitamin B1 (Thiamine) to help brain chemicals to function properly;
79. Vitamin B3 (Niacin) for healthy brain function;
80. Vitamin B5 (Pantothenic Acid) for help with attention-related issues;
81. Vitamin B6—for nerve sheathing and blood vessel flexibility;

82. Vitamin B8—also called inositol, for brain cell membrane synthesis;
83. Vitamin B9 for regulating homocysteine and cerebrovascular health;
84. Vitamin B12 for brain energy; and
85. Yerba Mate for focus-enhancing support.

Referring now to FIG. 3, tetrahydrocannabinol 210 is illustrated. Tetrahydrocannabinol (THC) is one of at least 113 cannabinoids identified in cannabis. Herein, the tetrahydrocannabinol and/or THC optionally refers to isomers of cannabinoid, tetrahydrocannabinol isomers, and/or (−)-trans-$\Delta^9$-tetrahydrocannabinol. Tetrahydrocannabinol is the principal psychoactive constituent of cannabis. Optionally THC is reacted with a reagent, R, to form a THC derivative, such as a THC-R molecule, where the THC-R molecule retains and/or enhances psychoactive properties of THC, where the reagent, R, chemically aides dissolution, homogenization, solubility, and/or emulsification of the THC portion of the THC-R molecule in a body of the product, an aqueous based product, and/or a product containing greater than 10, 20, 30, 40, 50, 60, 70, 80, or 90 percent water and/or a hydrophilic substance, and/or where the reagent, R, chemically and/or physically decreases viscosity of a THC containing additive, which aids in homogenization, distribution, and/or mixing of the THC into a viscous product, such as a cheese product and/or a cookie dough. For example, chemical reagent R and molecular sub-component R optionally and preferably has a hydrophilic end and an attachment end, where the attachment end bonds with THC and the hydrophilic end aid is dissolution in water or forming a suspension in water.

Optionally, the THC 210 used in any example herein is manufacture via distillation or extraction to a purity of greater than 25, 50, 75, 90, 92, 94, or 96%. Optionally and preferably, the THC is distilled multiple times and/or extracted multiple times, which reduces changes the THC from a mowed lawn flavor to flavorless, such as after three sequential distillations or an equivalent laboratory grade distillation.

Still referring to FIGS. 1-3, the multiple location product manufacturing system 100 used to amend the original product 112 with an additive 200 to form an amended product 114 is further described. For clarity of presentation and without loss of generality, two examples are provided of amending the original product 112 to form an amended product 114.

Example I

In a first example, an original product 112, such as a chocolate snack is manufactured where adding THC at greater than two milligrams per serving is illegal; the original product 112 is shipped to a second location where THC is legal; and THC is added to the chocolate to form the amended product 114.

Example II

In a second example: (1) an original product 112, such as a hot chocolate mix, a coffee additive, or a whipped cream is manufactured and is optionally labeled for sale to an end customer; (2) the original product 112 is shipped from a first location where addition of the additive 200, such as at an effective dose of the additive 200 to produce a psychoactive event, is illegal to a second location where addition of the additive 200, at the effective dose, is legal; and (3) the original product 112 is amended with an effective dose of the additive to form the amended product 114; and (4) optionally the amended product is distributed for sale in locations where the additive 200 is legal and/or shipment is legal.

Multiple Location Product Preparation

Figure 4:
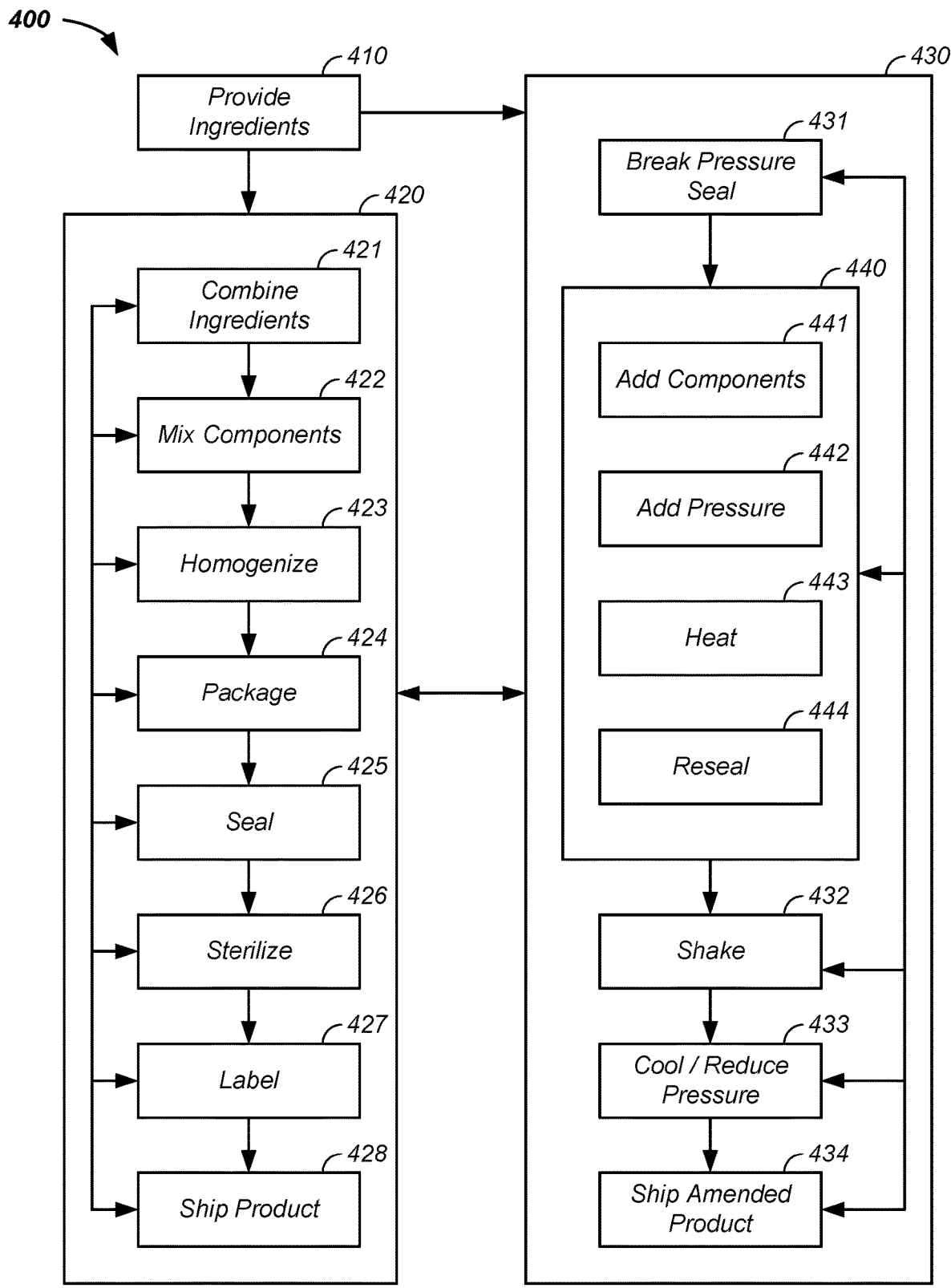
FIG. 4 illustrates a two-stage product preparation system.

Referring now to FIG. 4, a multiple location product preparation system 400 is described. Optionally and preferably, the multiple location product preparation system 400 is implemented as a portion of the multiple location product manufacturing system 100; however, any and/or all of the steps of the multiple location product preparation system 400 are optionally performed within a single location, such as a THC licensed manufacturing location. Generally, the multiple location product preparation system 400 includes a first location 420 and a second location 430, where zero, one, or more steps of manufacturing a product are performed in each of the first location 420 and/or the second location 430. For example, a described heating step, pressurizing step, shaking step, time passing step, resealing step, and/or sterilization step are optionally performed more than once, such as at the first location and subsequently at the second location. In another example, a step described herein for clarity of presentation and without loss of generality at the first location 420 is optionally performed only in the second location 430 without performing the step in the first location 420. The multiple location product preparation system 400 is further described in the non-limiting examples herein.

Example I

Still referring to FIG. 4, a first example of the multiple location product preparation system 400 is provided. In this example, a product formulation includes at least a set of constituents along with optional steps to assemble the ingredients to form the product.

In this first example, in a first step, a first portion of the ingredients is provided 410 to the first location 420, such as a first manufacturing location. Optionally and preferably, a second portion of the ingredients is provided to the second location 430, such as a second manufacturing location. In this example, the provided first ingredients 410 are combined 421, mixed 422, homogenized 423 and/or emulsified, packaged, 424, sealed 425, sterilized 426, labeled 447, and/or shipped 428. Optionally and preferably, a first set of sub-components of the provided ingredients are combined using one or more of the steps described herein into a first sub-mixture and a second set of sub-components of the provided ingredients are combined using one or more of the steps described herein into a second sub-mixture, where the number of sub-mixtures is any integer n, where n is a positive integer of greater than 1, 2, 3, 4, 5, or more. For instance, the first set of sub-components are combined and formed into an emulsion, such as with a homogenizer, which results in the first mixture. Subsequently, the second mixture is combined with the emulsified first mixture. The emulsification first process aids in forming a uniform distribution of each component in the resulting product, aids in dissolving an oil into an aqueous mix or vice-versa, and/or aids in homogenization of ingredients added to the already formed emulsion.

Still referring to FIG. 4, in one optional and preferred embodiment, the product formed at the first location is ready for distribution and sale. Said again, without any additional step at the second manufacturing location, the product is ready for sale, such as in a retail store to an end customer, an end user, and/or an end consumer. For instance, whipped cream, a spreadable/sprayable cheese, a cookie dough, an icing, a snack, a sweet, and/or a savory item, is prepared and is ready for sale from the first location, such as at a retail facility to a person who will consume the originally manufactured product. Optionally, the original product is amended at the second location, such as by the addition of THC at a THC licensed manufacturing facility. In another embodiment, an incomplete product is formed at the first location that is not fully ready for sale to an end consumer, such as a syrup used in a soda fountain machine. In this case, the incomplete product is amended and/or finalized at the second location, such as at a THC licensed manufacturing facility.

In this first example, still referring to FIG. 4, in a second step the product and/or the incomplete product formed at the first manufacturing location is subsequently shipped 428 to a second location 430. For clarity of presentation and without loss of generality, several cases of shipping from the first location 420 to the second location 430 are provided in Table 1. For instance, the product and/or the incomplete product is optionally manufactured at a first location in a state, such as Arizona, where addition of THC to a food product is illegal, then the product is shipped to a THC licensed manufacturing facility in Arizona where manufacturing of the incomplete product is finalized and/or the product is amended, such as through addition of one or more constituents, such as an optional THC component. Similarly, the product and/or the incomplete product is optionally manufactured in Utah where addition of THC to a food product is illegal, then the product is shipped to a THC licensed manufacturing facility in Arizona where manufacturing of the incomplete product is finalized and/or the product is amended, such as through addition of one of more constituents that optionally includes THC.

TABLE 1

Shipping

| First Location | Second Location |
| --- | --- |
| in state at non-THC licensed manufacturing facility | in same state at THC licensed manufacturing facility |
| first state non-THC licensed manufacturing facility | second state THC licensed manufacturing facility |
| first government zone/region/area prohibiting THC containing product production | second government zone/region/area allowing THC containing product production |

In this first example, still referring to FIG. 4, in a third step the incomplete product and/or original product 112 manufactured at the first location 420 is optionally completed and/or amended at the second location 430 to form the amended product 114. For instance, in a sub-case where the incomplete product and/or the product manufactured at the first facility is contained in a pressurized package, such as at greater than one atmosphere, an optional and preferred step is breaking the pressure seal 431. Subsequently or for a non-finalized product or product that is not contained in a pressurized packed, the product is amended in an amendment step 440. Herein, for clarity of presentation, the non-finalized product and the product shipped from the first location 420 are both referred to as original products 112, which are subsequently operated on, finalized, and/or amended at the second location 430 to form the final product(s) 114. In the amendment step 440, optionally and preferably components are added 441. For example, THC is amended into the product, such as further described infra. Optionally, the product is also pressurized, repressurized, and/or pressurized to a higher pressure 442; heated 443; and/or resealed 444. Notably, any other manufacturing step described herein or commonly performed is optionally additionally performed as part of the amendment step 440, such as mixing 422, homogenizing 423, sterilizing 424, and/or re-sealing 424. Notably, after and/or as part of the amendment step 440, one or more additional steps optionally occur, such as shaking the current product 432, heating the product, such as to alter a viscosity of one or more constituents of the product, cooling the product, reducing pressure in the container 433, and/or heating the product, such as in a water bath sterilization step. In one case, an ultrasonic mixer is used to mix in the amended constituents, such as THC, into the original product to form the amended product. Similarly, in a second case, an ultrasonic resonator, which is distinct from an ultrasonic mixer, is used to homogenize a product amended with a supplemental component, such as THC, to form the amended product. The ultrasonic resonator uses ultrasonic waves that resonate in phase with a natural frequency of a mixable object. For instance, a tube of cheese will have a resonant frequency and the ultrasonic resonator applies that resonant frequency to the tube of cheese to mix the tube of cheese. Further, the aforementioned steps of labeling 447 optionally occurs at any time at the second location 430. After the process of adding components 441 to the product, the product is optionally referred to as an amended product, a final product, or simply the product. The amended product is then optionally and preferably distributed/shipped 434 to a retail facility for sale, such as a marijuana dispensary.

Product Amendment

Referring now to FIGS. 5-15, the step of amending the composition/product 130 is further described. Generally, a raw ingredient, such as THC 210 is manipulated to: (1) form a stock solution, such as a THC stock solution 500 additive, such as a formulation that is diluted, compounded, homogenized, and/or an emulsified, where the generated stock additive has chemical and/or physical properties that facilitate a subsequent step of being added into and/or onto the original product 112 and (2) a given original product 112 is treated with the stock additive, which is a formulation of the additive 200, to form the final product 114. Typically, the stock additive is injected into, dropped onto, sprayed on, or mixed into the original product 112. The amendment process if further described infra.

Preparation of Stock Additive

Figure 5:
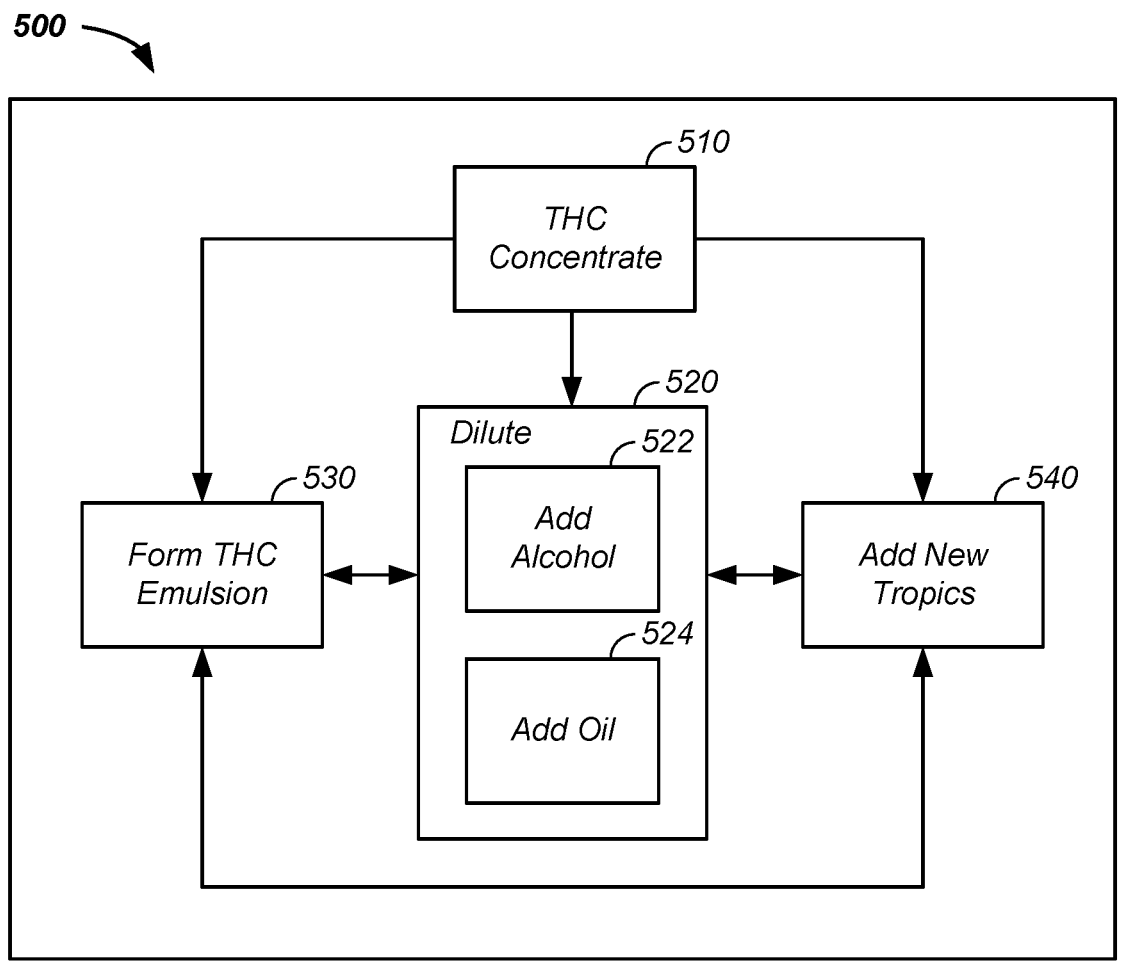
FIG. 5 illustrates formation of a THC/additive stock solution.

Referring now to FIG. 5, the process of forming the stock additive 500 is further described. Generally, the stock additive 500 is of any additive, with or without THC. However, again for clarity of presentation and without loss of generality, formation of a THC stock is used to described the process of forming any stock additive. The relatively pure form of THC is also herein referred to as a THC concentrate. Herein, the THC concentrate is processed by a manufacturer into a relatively pure form, such as greater than 50, 60, 70, 80, 85, 90, 91, 92, 93, 94, 95, 96, or 97% purity.

Still referring to FIG. 5, the relatively pure form of THC presents challenges in quantitative handling as the relatively pure form of THC has a high viscosity, such as like honey, and is concentrated enough that 10 mg of a pure THC concentrate is widely considered as a dose of THC by a consumer. Indeed, some states, such as Nevada, currently regulate a serving of THC in solution as being 10 or 12 mg of THC. To ease handling, the THC is optionally diluted 520 with an alcohol 522, such as ethanol, and/or an 524 oil, such as canola oil, olive oil, and/or a medium-chain length triglyceride (MCT) oil. Generally, any solvent is used for dilution. The dilution aids injecting or spraying THC onto the original product 112 as adding pure THC necessitates additions of less than 25, 20, 15, 10, 5, or 2 μL of the relatively pure form of THC, where additions of such volumes lead to increasing percent errors as the volume of addition of the THC decreases, such as from 1 to 1.5, 2, 5, 10, or 20 percent error at the cited volumes. However, additions of larger volumes of a diluted THC stock 500 lead to reduced errors, which are typically less than 0.5, 1, or 2 percent. In addition, moving the honey like relatively pure THC with a honey like viscosity of 1,000 to 20,000 centipoise results in still higher quantitative errors due to the relatively pure THC sticking to the equipment used in quantitative volume transfer of a liquid, such as a pipette and/or the end of a delivery tube, such as an injector, dropper, or sprayer. However, the dilution of the relatively pure form of THC, such as with the alcohol 522 and/or the oil 524, reduces the error back down to the sub-one percent level as the viscosity may be adjusted down to less than 500, 100, 50, 25, 15, or 12 mPa sec, which is readily transferred with chemistry laboratory techniques, such as use of a micropipette and/or is readily delivered with a dropper, sprayer, and/or injector.

Figure 6:
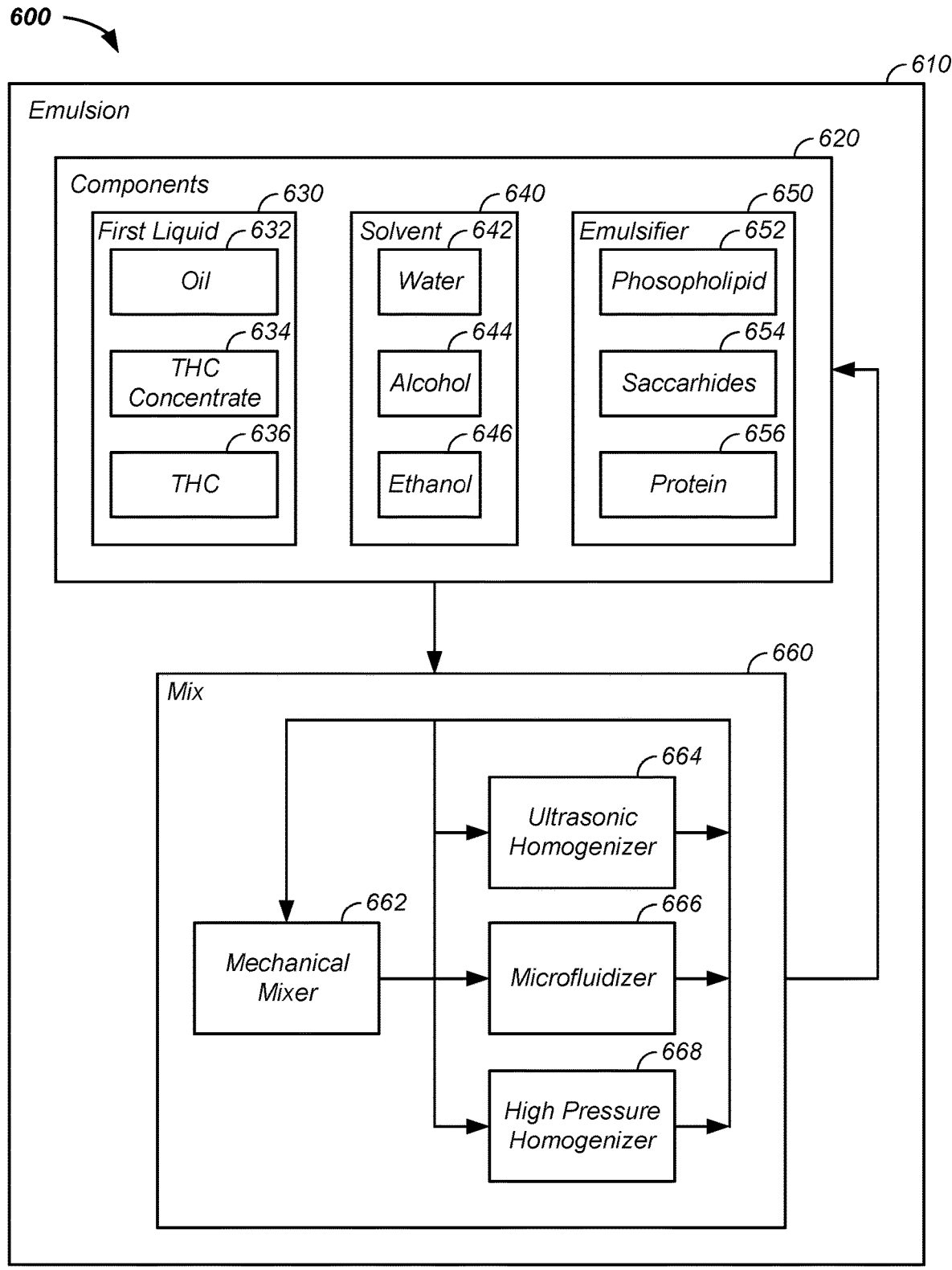
FIG. 6 illustrates formation of an emulsion.
Figure 17:
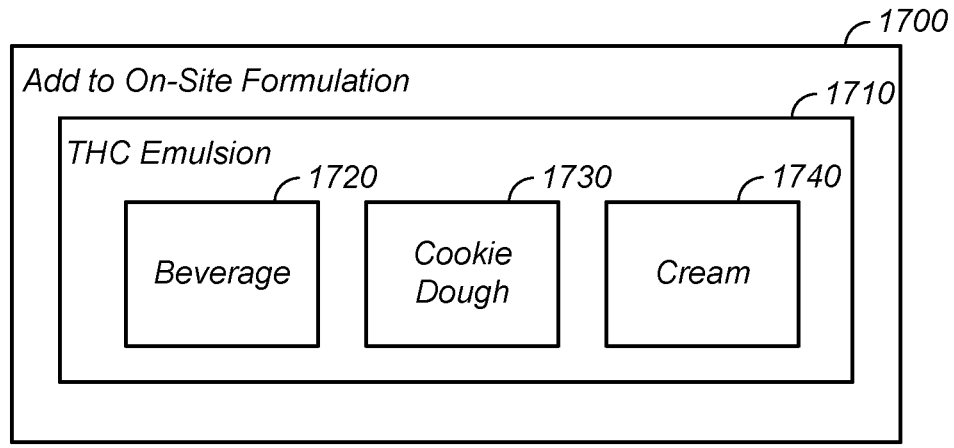
FIG. 17 illustrates a THC amendment of an on-site produced formulation.

Still referring to FIG. 5 and referring now to FIGS. 6 and 17, optionally and preferably a THC emulsion 1710 containing the THC 210 is formed. Formation of an emulsion 600 is further described infra. The THC emulsion 1710 is optionally formed through addition of an emulsifier and an aqueous solution to one or more of the THC concentrate 510 and the diluted THC stock 520. Optionally, a step of adding nootropics 540 to any of the THC concentrate 510, diluted THC 520, and/or THC emulsion 530 is performed in the formulation of the THC stock 500. As described, infra, the THC emulsion is subsequently injected into, dropped onto, mixed with, and/or sprayed onto the original product 112 in the formation of the amended product 114. The inventors have discovered that selection of chemical properties of the emulsifying agent to match a surface and/or a volume of the original product 112 facilitates adsorption of the THC onto the original product 112 and/or absorption of the THC into the original product 112 in the formation of the amended product 114. For instance, an emulsion of the THC 210 and a saccharide emulsifier aids adsorption of the THC 210 onto a starchy product, such as a chocolate or cheese puff and an emulsion of the THC 210 and a protein emulsifier aids adsorption of the THC 210 onto an oily product, such as some forms of oily potato chips. Notably, the inventors have discovered that a formulation of an emulsifier and THC 210 without an aqueous solvent and/or less than 30, 20, 10, 5, 2, or 1 percent water facilitates stickiness of the THC 210 onto a number of starchy, oily, and sweet, and savory products as the accessible portions of the emulsifier are attracted to the product and/or the water is internalized in cells within the oil.

Emulsion

The stock additive, described supra, which optionally contains THC and/or a nootropic, is optionally in the form of an emulsion. The emulsion is optionally injected into, dropped onto, and/or is sprayed onto the original product 112 to form the amended product 114 and/or is integrated into a formulation, such as in the formation of a beverage or a baked good.

Liquid Emulsion

Referring now to FIG. 6, an emulsion formation process 600 of forming an emulsion 610 is further described. A liquid emulsion is a system comprising two immiscible liquids where one liquid is dispersed in another, such as through use of an emulsifying agent. In examples herein, a first liquid 630, such as an oil, is suspended in a solvent 640, such as water. However, the water is optionally suspended in the oil. For clarity of presentation and without loss of generality oil in water emulsions are described.

Still referring to FIG. 6, generally components 620 of the emulsion 610 are combined and mixed 660. In one case, all of the components 620 of the emulsion 610 are combined and then mixed. In another case, at least some of the components 620 of the emulsion 610 are combined and mixed; at least some additional components are added to the mixture and the resulting mixture is further mixed, where any of the emulsion components 620 are added in the second step and the second step is repeated until all of the components 620 are added.

Still referring to FIG. 6, particular components 620 of the emulsion 610 comprise: (1) the first liquid 630, such as an oil 632, a THC concentrate 634, THC 636, and/or a nootropic; (2) the solvent 640, such as water 642, an aqueous solution, an alcohol 644, and/or ethanol 646; and (3) an emulsifier 650, such as a phospholipid 652, lecithin, a saccharide 654, a polysaccharide, gum Arabic, inulin, a modified starch, tween, cellulose, pectin, a protein 656, a gelatin, a caseinate, SPI, a dairy product, soy protein, whey protein, pea protein, a plant protein, and/or a chitin nanoparticle. Herein, for clarity of presentation and without loss of generality, emulsions of THC oil and/or an oil containing THC in an aqueous solution is described where the emulsion is formed with an emulsifier 650, such as lecithin.

Still referring to FIG. 6, an emulsifier is any one or more substances that stabilize an emulsion. Generally, an emulsifier has a first portion, such as a first portion of a molecule, that prefers to be in a first liquid, such as an oil, and a second portion, such as a second portion of the molecule, that prefers to be in a second liquid. An example of an emulsifier is lecithin. Lecithin is amphiphilic as it has a fat attracting portion or a lipophilic portion and a water attracting portion or a hydrophilic portion. Commercially available lecithin is a mixture pf phospholipids. Lecithin is an example of a glycerophospholipid. A glycerophospholipid is any derivative of glycerophosphoric acid that contains at least one O-acyl, or O-alkyl, or O-alk-1'-enyl residue attached to a glycerol moiety. Typically, lecithin has a glycerin backbone. In practice, lecithins are mixtures of glycerophospholipids including one or more of: phosphatidylcholine, phosphatidylethanolamine, phosphatidylinositol, phosphatidylserine, and phosphatidic acid. Lecithin is amphiphilic as lecithin attracts both water and fat substances.

Still referring to FIG. 6, at some point sub-components and/or all of the components 620 are mixed 660. Energy of a mixer translates to particle size of an emulsion. Typically, a step of mixing 660 the components 620 is done with one or more of a mechanical mixer 662, such as a home kitchen mixer, a home kitchen emulsifier, and/or a rotator-stator mixer. Sole use of a home kitchen mixer, which mixes at a rate of 0 to 2500 revolutions per minute (rpm), results in an emulsion having large particle sizes that separate in minutes to a few hours, which is however sufficient for some drop, spray, and/or injection processes for THC addition to the original product 112 to form the amended product 114, as further described infra. A home use kitchen emulsifier steps up rotation speed of the mechanical mixer to 6,000 to 20,000 rpm. Still faster mixing rates tend to degrade the DNA. A key feature of a home use kitchen emulsifier is that the mixing blade has a separation distance to a safety shroud of 0.5 to 5 or more millimeters. The home use kitchen emulsifier forms a more stable emulsion. However, the resulting micelles are still 2,000 nm or larger, which results in visible separation of an oil phase, like THC, and an aqueous phase within 24 hours. Again, this level of mixing is sufficient for some amendment tasks, but is insufficient for preparation of a stable THC in a beverage, such as in a soda. A higher quality rotator-stator mixer is an advanced mechanical mixer that mixes at the same rates as a high quality home emulsifier. However, the rotator-stator mixer spins a rotator within a static housing, where the separation of the rotator and the stator is less than 2, 1, 0.5, or 0.1 mm. Resulting shear forces on the components 620 between the rotator and the stator form micelles with mean diameters of 1,000 to 2,500, which results in a milky emulsion that is stable for greater than 6, 12, 18, or 24 hours, but typically show beginning separation within 1, 2, 3, or more days. An ultrasonic mixer 664 creates cavitation bubbles that break apart and form still smaller micelles of the emulsion components, such as THC and emulsifier, of greater than 300 nm, but smaller in diameter than result from the rotator-stator mixer. Two additional systems, a microfluidizer 666 and a high pressure homogenizer 668, each create still smaller micelles of THC and emulsifier in water, such as less than 300, 200, 100, or 90 nm mean diameter, excluding micelles of less than 20 nm diameter. Optionally and preferably, the homogenizer, such as the high pressure homogenizer applies a shear stress greater than 100,000 1/sec, 500,000 1/sec, or 1,000,000 1/sec to the emulsion.

The smaller diameter micelles are stable for months and are optically clear, which are both distinct advantages in clear sodas or drinks. Herein, a measure of clarity is optionally obtained with a red laser, where an optically clear beverage widens a red laser beam by less than three hundred percent at a full width half height over a pathlength of ten millimeters. Nanoparticles, despite colloquial usage of the term, contain micelles with a mean diameter of less than 1000 nm, excluding micelles of less than 20 nm in diameter. Hence, the ultrasonic homogenizer 664, the microfluidizer 666, and the high pressure homogenizer 668 form nanoparticles-sized emulsions, while the home mixer, home emulsifier, and rotator-stator mixer do not. Further, the microfluidizer 666 and the high pressure homogenizer 668 form emulsions that are clear and/or are stable for months or years. In preparation of THC containing emulsions, the inventors have identified several combinations of mixing steps that form clear and stable emulsions, such as with a sequence of mixing that starts with one or more of the mechanical mixer 662, optionally uses the ultrasonic homogenizer 664, and concludes with one or more of the microfluidizer 66 and the high pressure homogenizer 668. Further, the process of adding components 620 and mixing 660 is optionally iterative for n=2, 3, 4, 5 or more iterations. The inventors have determined that operating a rotor-stator mixer at greater than 5000 rpm and less than 13,000 rpm reduces bubble formation and results in enhance stability of emulsions that are later processed with an ultrasonic mixer.

THC/Emulsifier Combination

Notably, an emulsifier free emulsion is optionally used to deliver THC to the original product 112. For example, the THC is suspended, at least temporarily, in a second liquid, such as the solvent 640, with or without the use of any emulsifying agent. Further, an emulsion is optionally formed with: (1) THC and/or a THC/oil mix and (2) an emulsifier without the solvent 640 or with minimal solvent, such as less than 10, 5, 2, 1, 0.5, or 09.1 percent water.

Still referring to FIG. 6, the inventors have discovered that THC/emulsifying agent emulsion without the aqueous phase allows quantitative dilution of the THC, as described supra, and a low viscosity solution that aids transfer of the THC, as described supra. Further, in the low/no aqueous phase emulsion formulation, dubbed a solvent free emulsion, properties of a selected emulsifying agent facilitate adsorption onto and/or absorption into the original product 112. Two examples further illustrate the concept of examining the chemical structure of the original product 112 and selecting a compatible chemical structure of the emulsifier in a THC/selected emulsifier solvent free emulsion to aid adsorption and absorption of the THC into the original product 112 to form the amended product 114.

Example I

In a first example, the original product 112 has a starchy outer layer or a permeable starchy structure, such as a cheese puff. The starchy/non-oily structure of a cheese puff chemically and physically attracts (like attracts like chemical principle) polysaccharide emulsifier of a THC/polysaccharide emulsifier solvent free emulsion. More particularly, the polysaccharide emulsifier, encasing the THC oil, attracts to the starchy/dry surfaces of the cheese puff, such as both on an outer perimeter of the cheese puff and within a porous/permeable structure of the cheese puff. Said again, the accessible polysaccharide surface of a THC oil/polysaccharide low solvent or no solvent emulsion adsorbs onto and/or absorbs into the cheese puff as the chemical properties of the polysaccharide emulsifier chemically attract to the accessible surfaces of the cheese puff, which forms a stable and/or homogenous THC coating.

Example II

In a second example, the original product 114 has an oily outer layer, such as an oily chip or potato chip. The oily structure/surface of the oily chip chemically and physically attracts (like attracts like chemical principle) an oily emulsifier of: (1) a THC/protein emulsifier solvent free emulsion or (2) simply THC cut with an oil. More particularly, the oil attracting surface of a protein emulsifier, encasing the THC oil, the THC oil, and/or an oil used to cut/dilute THC attracts to the oily surfaces of the chip, such as both on an outer perimeter of the chip and within a porous/permeable structure of the chip. Said again, the accessible oily surface of pure THC, a THC cut with oil, and/or THC/protein emulsifier with little to no solvent adsorbs onto and/or absorbs into the oily chip as the oily surfaces attract oily surfaces, which forms a stable and/or homogenous THC coating.

Add Additive to Product

Figure 7:
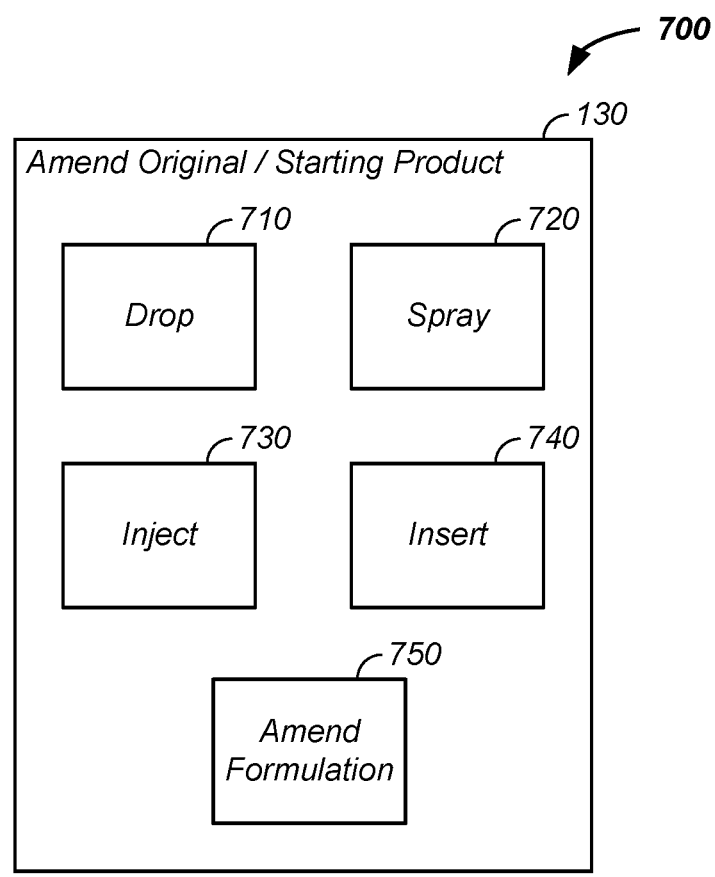
FIG. 7 illustrates methods of amendment of a starting product.

Referring now to FIG. 7 and FIG. 8, processes of amending the composition/original product 130 are described. For example, the original product 112 is amended to include one or more of THC and/or a nootropic.

Referring now to FIG. 7, five optional processes of amending the composition/original product 130 are described. Again for clarity of presentation and without loss of generality, the amendment processes use examples of amending with THC. A first amendment process adds THC to the original product 112 by dropping 710 THC and/or a mix containing THC onto the original product 112 to form the amended product 114 now containing THC. Generally, the THC, in the form of a liquid or a solid, is dropped onto the original product 112. For instance, crystallized THC is dropped onto the original product 112. In another case, a liquid and/or an emulsion containing THC is dropped onto the original product 112. For example, a liquid containing THC is mechanically pumped onto individual elements of the original product 112, without a human physically/directly moving a pump dispersing element of the semi-automated or automated pump. A second amendment process adds THC to the original product 112 by spraying 720 THC and/or a liquid solution containing THC onto the original product 112 to form the amended product 114 now containing THC. For instance a chip, pretzel, and/or gummy is sprayed with the THC containing solution and/or the THC containing emulsion. A third amendment process adds THC to the original product 112 by injecting 730 THC and/or a liquid solution containing THC into the original product 112 to form the amended product 114 now containing THC. For instance, cream filled chocolate, a liquid filled chocolate, and/or a gummy is injected with the THC, THC containing solution, and/or the THC containing emulsion. A fourth amendment process adds THC to the original product 112 by inserting 740 THC and/or a liquid solution containing THC into the original product 112 to form the amended product 114 now containing THC. For instance THC is inserted into a canister of liquid cheese, a whipped cream container, a tube of cookie dough, and/or icing. In all cases, the THC is adsorbed onto the surface of the original product 112 and/or the THC is absorbed into the original product 112 to form the amended product 114, now containing THC. In all cases, the THC is optionally and preferably mechanically added to the original product 112 without direct handling of the application apparatus by a human. For instance, that applicator is under computer control and uses a pump, volume delivery system, atomizer, sprayer, mister, injector, syringe, and/or dispenser. A fifth amendment process amends a formulation 750. For instance, THC, a THC stock, and/or a THC containing emulsion is added to a formulation before packaging as the amended product 114. For instance, the THC is added to an original product of a syrup mix used to make sodas and/or is added to a brite tank of a drink ready for canning or bottling. Each of the amendment processes is further described infra.

Referring now to FIG. 8, additional examples of amending, spraying, injecting, and inserting THC 210 and/or an amendment additive 200 are provided. As illustrated, the technique of dropping 710 THC 210 onto an original product 112 to form the amended product 114 is optionally used to add THC 210 and/or the amendment additive 200 to any of: a sweet snack 711, such as a chocolate snack 712 or a gummy 713; a salty snack 714, such as a chip 715, cracker 716, or Chex mix; and/or to a savory snack 717, such as a cheese puff 718, cheese flavored chip, cheese flavored cracker, or cheese. Similarly, as illustrated, the technique of spraying 720 THC 210 onto an original product 112 to form the amended product 114 is optionally used to add THC 210 and/or the amendment additive 200 to any of: a sweet snack 711, such as chocolate 721 or a chocolate bar, a chocolate snack, a candy, a caramel, and/or a gummy; a salty snack 714, such as a chip 715, a snack mix 722, and/or a cheese puff 723. Similarly, as illustrated, the technique of injecting 730 THC 210 onto and/or into an original product 112 to form the amended product 114 is optionally used to add THC 210 and/or the amendment additive 200: into a chocolate snack 712, into a gummy 713, into a cheese puff 723, and/or into a beverage 724. Similarly, as illustrated and further described infra, the technique of inserting 740 THC 210 onto and/or into the original product 112 to form the amended product 114 is optionally used to add THC 210 and/or the amendment additive 200 to any of: whipped cream 741, spray cheese 742, cookie dough 743, and/or icing 744. Notably, one or more amendment approaches work for a common food/beverage item, such as one may drop onto, inject into, and/or spray a gummy. Generally, any of the amendment approaches of dropping 710, spraying 720, injecting 730, inserting 740, and/or amending a formulation 750 are optionally used on any food product and/or with any beverage product, such as soda, an alcoholic drink, and/or coffee, albeit with differing outcomes of stability.

Still referring to FIGS. 7 and 8, a selected addition technique and/or a selected chemical/physical make-up of the THC/additive solid, crystal, solution, mixture, homogeneity, and/or emulsion is optionally and preferably dependent upon the chemical/physical properties of the make-up of the food/drink product to be amended. For instance, an aqueous drink product will naturally separate from oily THC, so the THC is optionally and preferably emulsified so that when the THC emulsion is added to the aqueous solution, the THC containing droplet, cells, and/or micelles disperse to form a homogenous solution as opposed to clumping together and floating to the top of the aqueous solution, such as in a soda. Indeed, many states require homogenization of the THC in the food/beverage product. For instance, Nevada requires that each serving of a THC containing fluid, such as a soda, have no more than 10 mg THC. Thus, if 40 or 50 mg of THC are added to a soda and/or are formulated into a soda that is labeled as having 4 or 5 servings per container, such as an 8, 12, 16, or 20 ounce soda container, then the THC must be homogenous in the soda as if the THC separates or clumps and floats in the soda, one serving may have greater than 90 or 95% of the 40 or 50 mg of THC, which is illegal and may not be safe for some consumers. Similarly, if a food product is selected that has an oily coating, then dropping a liquid emulsion of THC onto the oily food product is likely to result in the THC emulsion running off of the oily food product, which results in an unsatisfied consumer who did not receive the THC on the food product as it is left as a coating inside a shipping container, such as a bag. Thus, a better addition selection for the food product with an oily coating is: (1) injection of: THC 210, the THC stock 500, the diluted THC 520, and/or the THC emulsion 530 into the food product with the oily surface if the food product with the oily surface contains a cavity, a liquid center, is porous (like a cheese puff), and/or is readily amendable to rapid internal diffusion, such an air whipped chocolate filling; (2) spraying of: THC 210, the THC stock 500, the diluted THC 520, and/or the THC emulsion 530 onto the food product with the oily surface if the food product with the oily surface is adsorbent enough to adhere to the THC oil and/or if the food product with the oily surface is porous (like a cheese puff or soft cracker). Generally, the chemical outer surface of the selected form of THC (concentrate, oil dilution, or emulsion) is optionally and preferably matched chemically to an accessible surface of the food product (THC oil to accessible food oil or THC water emulsion to accessible food water). Similarly, the selected form of the THC (concentrate, oil dilution, or emulsion) is optionally and preferably matched with porosity of the selected food product. For instance, an oil thinned THC solution or even a thinned THC emulsion will penetrate well into a porous food product while the THC concentrate 510 may be too viscous to penetrate into the porous food product. Optionally and preferably, the THC stock 500, the diluted THC 520, and/or the THC emulsion 530 is created to have a viscosity of greater than 1 and less than 10, 12, 15, 20, 30, 50, 100, 1000, 5000, or 10,000 mPa sec or centipoise or an equivalent measure in centistokes.

Automated Production

In the THC production world, THC containing products are made one at a time by hand. For instance, a worker takes a syringe of THC and injects raw THC into a gummy. At best, a worker bakes a tray of brownies infused with raw THC. As a result, costs are high, precision is poor, accuracy is bad, and homogeneity of THC within a product is terrible. This is largely due to no consideration of chemical THC properties in relation to a food product, which typically results in large, even illegal, amounts of THC in one serving and essentially no THC in another serving within a single package. Further, no automation exists, such as used in international and/or national production facilities, as it is illegal to ship across state lines any THC product. Thus, the massive production facilities for commonly available products may not be used to produce THC containing products as distribution of the THC containing product across state lines is currently, as of 2020, illegal in the United States.

Figure 9:
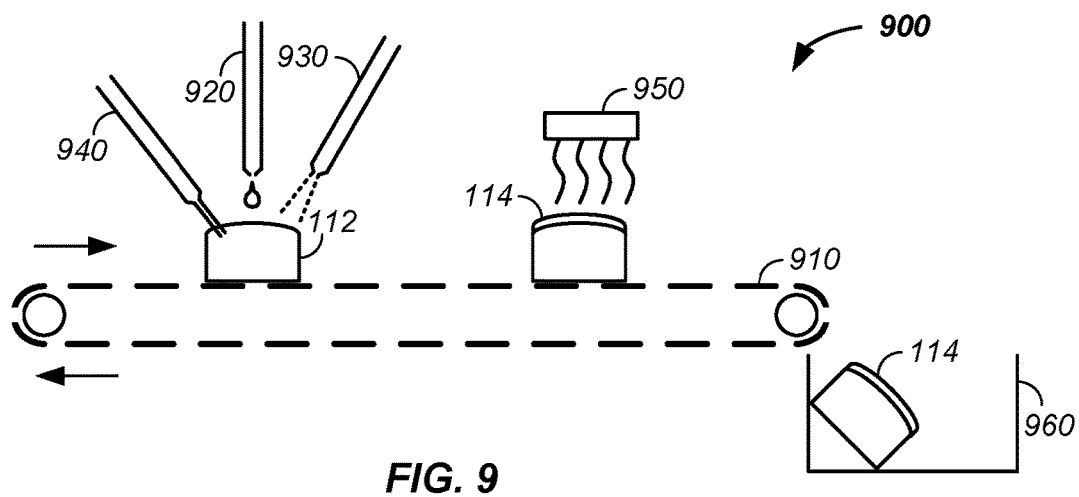
FIG. 9 illustrates automated mass production.

Referring now to FIG. 9, a semi-automated/automated amendment production line system 900 is described. Again, for clarity of presentation and without loss of generality, examples herein use THC as a representative additive. Generally, mass production techniques are modified for THC addition to the original product 112 to form the amended product 114, as further described infra.

Still referring to FIG. 9, the semi-automated/automated amendment production line system 900 optionally and preferably moves the original product 112, such as on a conveyor belt 910 past: (1) a dropper 920, which is part of a dropper system used to perform the task of dropping 710 the THC onto the original product 112 to form the amended product 114; (2) a sprayer 930, which is part of a sprayer system used to perform the task of spraying 720 the THC onto the original product 112 to form the amended product 114; and/or (3) an injector 930, which is part of an injector system used to perform the task of injecting 730 the THC into the original product 112 to form the amended product 114. Optionally, a dryer 950, such as a heating system is used to dry the THC additive once dropped onto and/or sprayed onto the now amended product 114. Optionally and preferably, the amended product 114 is automatically packaged with a packaging system 960, such as an automated bagging system, an automated boxing system, and automated canning system, and/or an automated bottling system. Optionally and preferably, no human is handling/holding the original product 112, any element of the dropping system, any element of the sprayer system, and/or any element of the injector system while the additive, such as THC, is applied to the original product 112 to form the amended product. Further, optionally and preferably, the packaging system 960 functions without any human touching the amended product 114 or the container into which the amended product 114 is packaged at the time of packaging. Optionally and preferably, a human operator operates a computer controlled controller at an operating station, where the computer then controls the amendment and/or the packaging steps. Examples are provided, infra, that further describe the semi-automated/automated amendment production line system 900.

Example I

Figure 10:
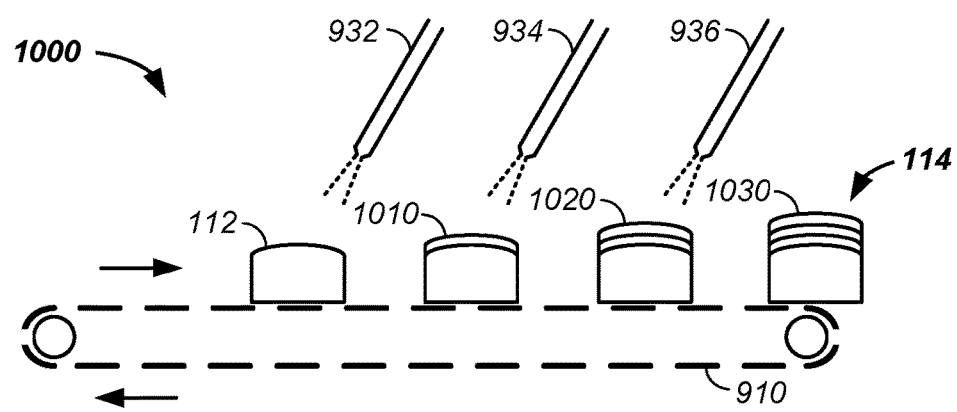
FIG. 10 illustrates use of a binding agent.

Referring now to FIG. 10, a first example of the semi-automated/automated amendment production line system 900 is provided. In this example, a system of multiple amendments 1000 to the original product 112 is illustrated. As illustrated, the original product 112 is sprayed multiple times with the spraying system. However, multiple additives are optionally dropped onto, sprayed onto, and/or injected into the original product 112, with the dropper 920, the sprayer 930, and/or the injector 940 respectively. For instance, a first sprayer 932 optionally sprays a bonding agent, such as a gum containing solution; a second sprayer 934, simultaneously or at a later time, sprays on the additive, such as the THC stock solution 500; and a third sprayer 936, simultaneously or at a later time, sprays on another binding agent layer or a sealing layer, such as a chocolate or edible waxy coating. As illustrated, sequential uses of the first sprayer 932, the second sprayer 934, and the third sprayer 936 respectively form a first coating layer 1010, a second coating layer 1020, and a third coating layer 1030 on the now amended product 114. In one case, the middle second coating layer 1020 contains THC, which is held to the original product 112 by a binding layer, such as the first layer 1010, and is optionally sealed onto the amended product 114 by the optional sealing layer, the third layer 1020, which is optionally another binding layer. As the first, second, and third layers are optionally co-sprayed and/or are miscible while still wet, the three layers optionally and preferably mix and bind. Generally, the sprayer adds any number, n, layers, such as 1, 2, 3, 4, 5, or more layers.

Example II

Figure 11:
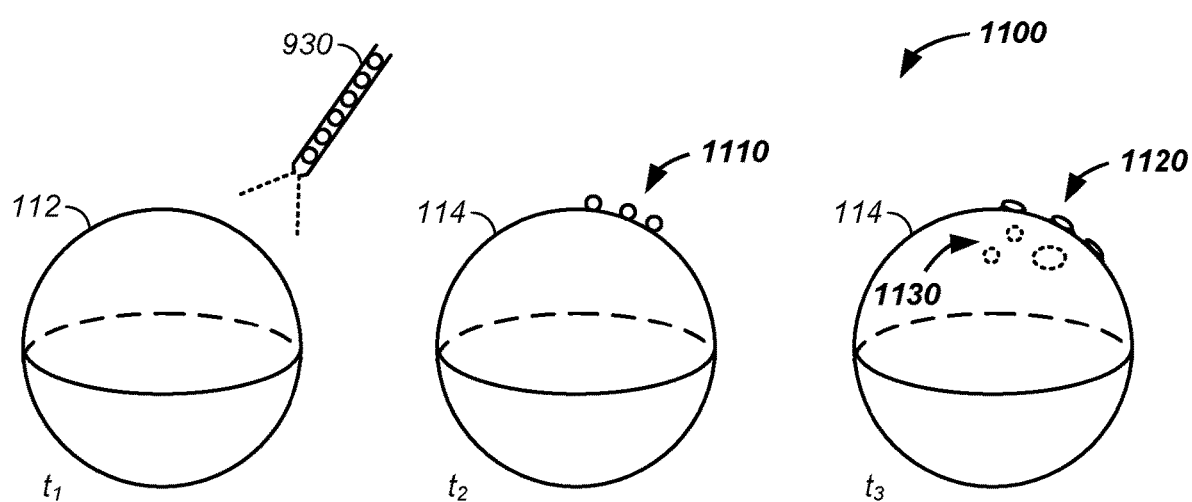
FIG. 11 illustrates amendment adsorption and absorption.

Referring now to FIG. 11, a second example of the semi-automated/automated amendment production line system 900 is provided. As illustrated, the sprayer 930, which is optionally the dropper 920, quantitatively sprays, such as by volume, an amendment, such as a portion of the THC stock solution 500, onto the original product 112, which initially, such as at a first time, $t_1$, adsorbs 1110 and/or undergoes adsorption onto the surface of the now amended product 114. At a second time, the amendment, such as the applied portion of the THC stock solution 500, spreads 1120 on the outer surfaces of the amended product 114 and/or absorbs into and/or undergoes absorption into the amended product 114. The inventors have determined that matching chemical properties of the THC stock solution 500 to the accessible surfaces/volumes of the original product 112 facilitates the THC bonding to, adhering to, joining with, absorbing into the now amended product 114; aids retention of the THC on the amended product 114; and/or facilitates homogenous distribution of the THC on/within the amended product 114.

Injection

Figure 12:
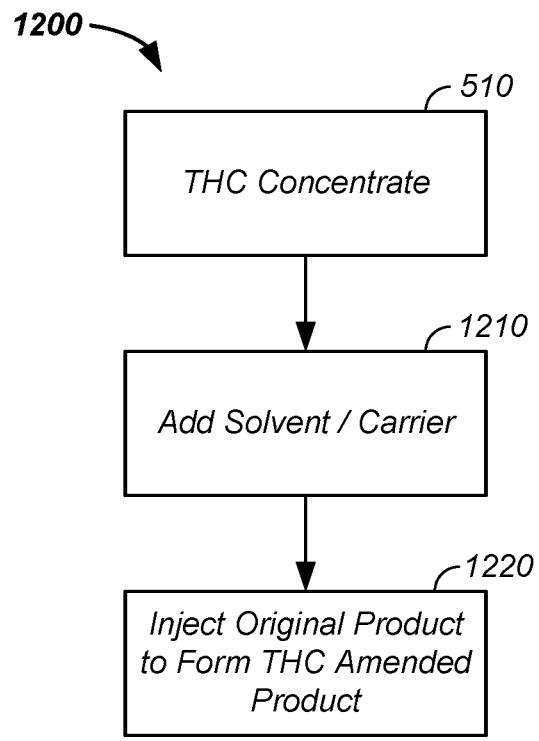
FIG. 12 illustrates an injection process.

Referring now to FIG. 12, the process of injecting 730 is further described. An injection amendment process 1200 is illustrated in FIG. 12. Generally, the THC concentrate 510 is diluted by adding a solvent and/or a carrier 1210 to form a diluted THC solution and/or a THC emulsion, as described supra, which is easier to quantitatively handle, as described supra. The, now diluted THC, is subsequently injected 1220 into the original product 112 to form the amended product 114. In a case of injecting a cream filled chocolate, an internal liquid/paste of the cream filled chocolate preferably has a viscosity of less than 1000, 500, 200, or 100 mPa sec, which allows the diluted THC to adhere to and/or mix with the cream center and allows injection of the THC, such as a portion of the THC stock 500, into the chocolate without overflowing back out of the chocolate as is the case when trying to inject the THC into a highly viscous hard chocolate coating or into a highly viscous caramel, such as with a viscosity exceeding 1000 centipoise (cps), which is a measured viscosity of caramel candy. Optionally, a portion of the injector 940 contacting the original product, such as a chocolate shell, is elevated in temperature to a range of 80 to less than 140, 150, 160, 170, 180, 190, 200, 250, or 300 degrees Fahrenheit, which melts/lowers hardness/viscosity of the chocolate. More preferably, the injector is maintained at less than 200, 180, 170, 150, 130, 110, 102, or 100 degrees Fahrenheit as THC starts to evaporate at 150 degrees Fahrenheit and terpenoids start to evaporate at 102 degrees Fahrenheit.

Example III

Figure 13:
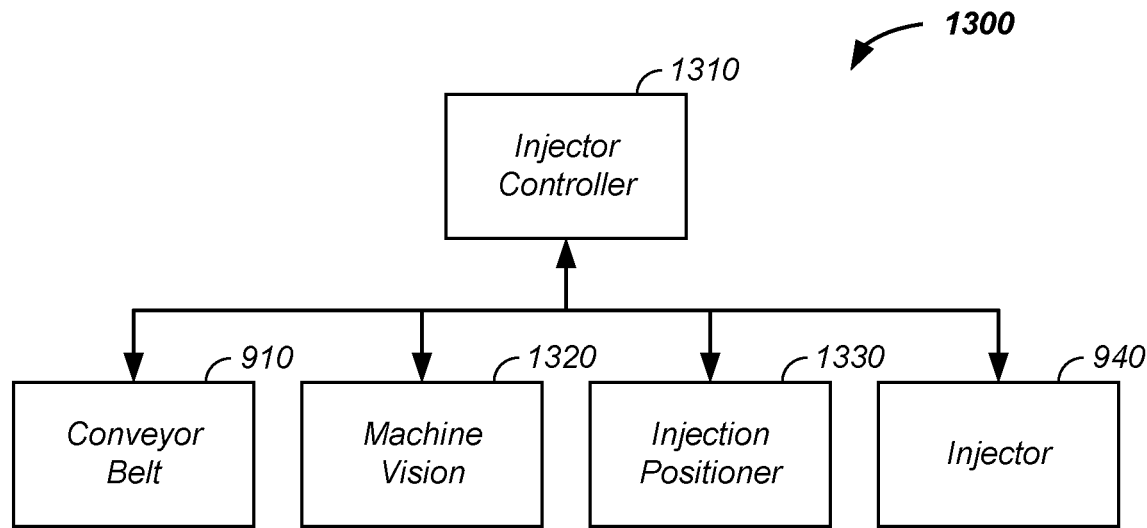
FIG. 13 illustrates control of an injection process.

Referring now to FIG. 13, an injection system 1300, such as of the semi-automated/automated amendment production line system 900 is described. Optionally and preferably, the injection system 1330 includes an injection controller 1310, which controls and/or receives input from one or more of: the conveyor belt 910, a machine vision system 1320, an injection positioner 1330, and the injector 940. For instance, the injection system 1330 and/or a main controller that control the injection system and/or other sub-units of the semi-automated/automated amendment production line system 900, controls movement of the conveyor belt 910 to move a series of original products 112 to the injector 940. Optionally and preferably, the injector controller 1310 controls an injection positioner 1330, such as an x-, y-, and/or z-axis controlled injector, and a pump (not illustrated for clarity of presentation) linked the THC stock and to the injector 940 to move the injector 940, sequentially, from a non-delivery position, into contact with the original product 112, into the original product 112, and after the pump delivers the THC stock 500 or the like into the now amend product 114, out of and away from the now amended product 114. Optionally and preferably, the injector controller 1310 is aided with knowledge of a current position of one or more elements of the original product 112 through the use of one or more mechanical product guides, one or more mechanical product stops, and/or machine vision 1320, as further described infra.

Example IV

Figure 14:
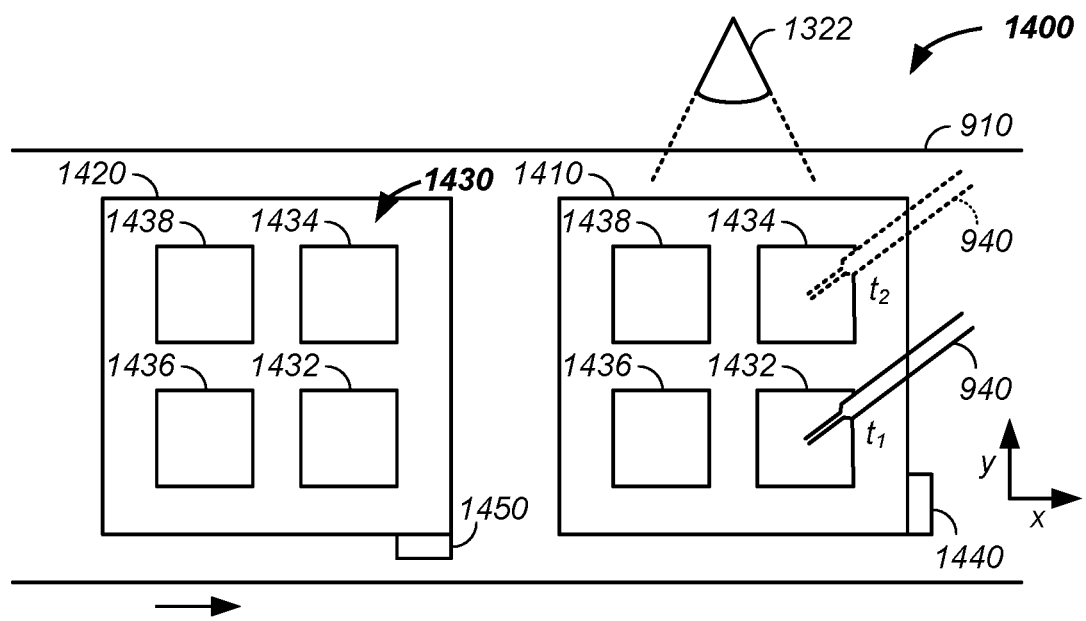
FIG. 14 illustrates sequentially controlled injection.

Referring now to FIG. 14, a system of injecting multiple elements per tray, box, and/or container 1400 is illustrated. As illustrated, the conveyor belt 910 moves a first container 1410 into position, such as along the x-axis, where the first container 1410 is optionally guided/positioned by one or more guide rails 1450 and/or is positioned by one or more mechanical stops 1440. The illustrated first container 1410 and second container 1420 are two of a potentially endless line of containers. Each container contains a set of n original products 1430, where n is a positive integer of 1, 2, 3, 4, 5, or more. As illustrated, each container contains four original products, a first original product 1432, a second original product 1434, a third original product 1436, and a fourth original product 1438, such as chocolates. Optionally, a camera 1322 of an imaging system or the machine vision system 1320 informs the injector controller 1310 as to the location of each set of n original products 1430 as the original products near the injector 940. Optionally and preferably, the injector controller moves the injector 940 along x-, y-, and/or z-axes to inject, sequentially, to each of the original products, such as the first original product 1432 being injected at a first time, $t_1$, and the second original product 1434 being injected at a second time, $t_2$, which continues from item to item and from tray to tray.

Pressurized Container Amendment

Figure 15:
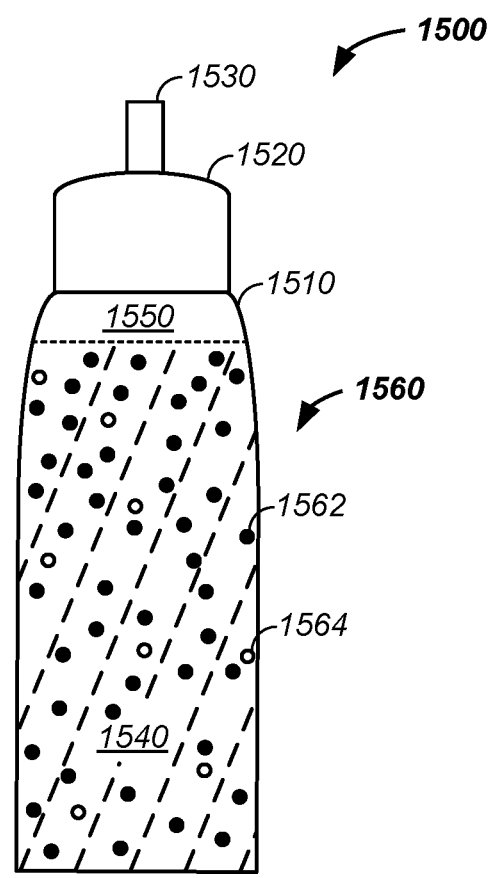
FIG. 15 illustrates a multiple component formulation.

Referring now to FIG. 15, FIG. 16A, and FIG. 16B, an example of the insertion 740 method of the process of amending the starting product 130 is provided, where a pressurized product is amended.

Example I

In a first example, referring now to FIG. 15, an amended pressurized product 1500 is illustrated, which is an example of an amended product 114. As illustrated, the amended pressurized product 1500 is packed in a pressurized container 1510, such as a canister. The pressurized container 1520 include a valve portion 1520, which in this case is illustrated in an upper portion of the pressurized container 1510. The valve portion 1520 contains a lever, valve, and/or port that is repetitively opened and closed by a user, such as to dispense the product 1500. As illustrated, the pressurized container 1510 contains a delivery port 1530.

For clarity of presentation and without loss of generality, in the second example, still referring to FIG. 15, whipped cream is used to describe the amended pressurized product 1500, which is dispensed from a pressurized container 1510. However, other products are optionally delivered from a pressurized container 1510, such as cookie dough, icing, a beverage, or spray cheese. While the pressurized container details will vary with product, such as going from an aerosol container to a canister with a piston wiper valve and a separated pressurized portion of the container, the concepts described herein of opening the pressure seal, amending the product, and resealing/re-pressurizing the container still apply.

In this first example, still referring to FIG. 15, the pressurized container is described in terms of zones and in terms of product constituents. First, the pressurized container 1510, as illustrated, contains a liquid/semi-solid zone 1540, such as liquid portion or high viscosity portion, and/or a gas zone 1550, such as a gas portion 1550. For instance, in the case of a whipped cream canister, the liquid portion is cream and the gas portion is a propellant, such as carbon dioxide, argon, a noble gas, butane, and/or preferably nitrous oxide. For clarity of presentation and without loss of generality, the gas is referred to herein as nitrous oxide. The propellant, such as nitrous oxide, resides in the gas portion 1550, which is also referred to as a headspace. In the case of nitrous oxide, which is similar to other gases, the nitrous oxide partially dissolves into the cream. When the cream, containing the nitrous oxide, moves from the pressurized contain 1510 to atmospheric pressure, the nitrous oxide expands. The expansion of the nitrous oxide expands/whips the cream into whipped cream. Second, the pressurize container 1520, as illustrated, contains the product 1560, which contains n constituents, where n is a positive integer of greater than 0, 1, 2, 3, 4, 5, or 10. As illustrated in this whipped cream example, a first constituent 1562 comprises cream and a second constituent 1564, such as THC. For clarity of presentation, the gases dissolved in the cream are not illustrated and components solvating, bonded to, adhered to, chemically bonded to, and/or mixed with the THC are not illustrated. As the cream is dispensed from the pressurized container, through the valve portion 1520, and optionally through the delivery port 1530, the THC is delivered in the resultant whipped cream.

In this first example, now referring to FIGS. 15, 16A, and 16B, the formation of the amended product in the container, such as the pressurized container 1510 is described. The pressurized container 1510 contains a valve portion 1520. Generally, the valve portion 1520 alternatingly allows passage of a contained component through the valve and stops passage of the contained component through the valve. Many types of valves exist, such as toggle, check, globe, plug, gate, globe, plug, ball, butterfly, check, diaphragm, pinch, pressure relief, Lindal, and/or control valves. Herein, all valve types are openable and closable. The valve is optionally positioned anywhere in the pressurized container 1510 and/or is affixed to the pressurized container 1510. As illustrated, the valve portion 1520 includes a flow control component 1522, which is a portion of any of the above listed valve types.

In this first example, referring still to FIGS. 16A and 16B, an amendment process 1600 includes attaching an amendment container 1610 to at least a portion of the pressurized container 1510 that is openable, such as the valve portion 1520 and/or the delivery port 1530. More particularly, a seal is formed between an output of the amendment container 1610 and an input/output of the pressurized container 1510. Typically, the valve portion 1520 of the pressurized container 1510 controls dispensing the product 1500 out from the pressurized container 1510, such as through the delivery port 1530. However, in the amendment process, flow through the valve portion 1520 is reversed. More particularly, amendment contents 1563 of the amendment container 1610, such as the second portion of the ingredients, described supra, sequentially pass from the amendment container 1610, through the valve portion 1520, and into the pressurized container 1510. In this manner, contents of the amendment container 1610 are transferred into the pressurized container 1510, which mix and/or react with the incomplete product and/or the product contained in the pressurized container 1510 to form an amended product, current product, updated product, modified product, the final product, a secondary product, and/or, after the addition of contents from the amendment container, simply the product 1500.

In this first example, still referring to FIGS. 16A and 16B, the amendment process 1600 temporarily opens a passage into the pressurized container, such as through the flow control component 1522. As described, supra, many valve types are optionally used. Further, many valve types include sub-options on how to open the valve. For instance, a toggle valve stem is pushed sideways to open up a toggle valve seal, where herein the toggle valve is an example of the valve portion 1520 and the toggle valve seal is an example of the flow control unit 1522. Further, the stem is a component of the valve. Similarly, a ball valve is another example of the valve portion 1520 operated by a lever and the ball with a hole in it that is turned in a ball valve is another example of the flow control unit 1522. More generally, any valve type is an example of the valve portion 1520 and any operable element of the valve type that controls flow, in and/or out, is an example of the flow control unit 1522. As illustrated, an opening/shutting control element 1640 operates on the valve portion 1520 to alternatingly open and close the valve, which controls flow of substance into and/or out of the pressurized canister 1510. Notably, the opening/shutting control element 1640 is in a first case built into the valve, such as a handle is built into a ball valve and a stem is built into a toggle valve. However, the opening/shutting control element 1640 is in a second case designed for use to open a valve flow control unit 1522 in a manner not originally designed into the valve type, as originally manufactured/sold. As illustrated, the opening/shutting control element 1640 is inserted into the valve portion 1520, optionally through the delivery port 1530, where the opening/shutting control element 1640 temporarily opens the flow control unit 1522. When the opening/shutting control element 1640 is withdrawn from contact with the flow control unit 1522, the flow control unit 1522 shuts and operation of the valve portion as manufactured is restored. The opening/shutting control element 1640 is optional when the built in mechanism of the valve portion 1520 includes a mechanical and/or an electromechanical element that is built in to control opening and shutting the flow control unit. In this case, the valve portion 1520 is optionally opened and/or closed using the originally manufactured control, such as a button, switch, stem control in the toggle valve example, and/or lever in the ball valve example. In this case, the opening/shutting control element 1640 is optionally used to operate the original control, such as through a robotic control. For instance, the opening/shutting control element is used to provide a sideways torque to the stem of the toggle valve or to rotate the handle in ball valve examples. Timing of operation of the opening/shutting control element 1640 is timed to injection/insertion of the amendment contents 1563 from the amendment container 1620 into the pressurized canister 1510, such as through a direct connection, an injection line or tubing. Generally, an attachment is made between the amendment container 1620 and the pressurized container 1510 through which the amendment contents 1563 flow and the opening/shutting control element 1640, timed with a desired flow of the amendment contents 1563 into the pressurized container 1510, opens and shuts the flow control unit 1522 of the valve portion 1520. For instance, a hose, through which the amendment contents 1563 flow, connects the amendment container 1620 to the pressurized container 1510 and in the case of a toggle valve, the opening/shutting control element provides a sideways pressure on the stem of the toggle valve to control when the amendment contents 1563 flow into the pressurized canister 1510.

In the first example, still referring to FIGS. 16A and 16B, as illustrated at the first time, the unamended product, such as the product shipped 428 from the first location 420 contains the liquid zone/high viscosity zone 1540 and the gas zone 1550. For the illustrative example of whipped cream, the liquid zone 1540 comprises cream and the gas zone 1550 comprises a propellant, such as nitrous oxide as described supra. Similarly, for a sprayable cheese product, the liquid zone/high viscosity zone 1540 comprises liquid cheese and/or semi-liquid cheese and there is essentially no gas zone in a food product chamber. At the first time, $t_1$, the amendment container 1620 is attached to the pressurized container 1510. For instance a tube connects an output of the amendment container 1620 to an as yet still closed input element of the pressurized container. Optionally, the connection is air tight for the case of an already pressurized container. The connection could simply be gravity directing flow of output from the amendment container 1620 to the pressurized container 1510 in cases where the pressurized container is not yet pressurized and/or has not yet been sealed, such as in a process of fitting the valve portion 1520 onto and/or into the pressurized container 1510.

Optionally and preferably, at a second time, $t_2$, at least a portion of the amendment contents 1563 are transferred from the amendment container 1620 into the pressurized container 1510. As illustrated, during at least a portion of the second time, $t_2$, the opening/shutting control element 1640 functions to open the flow control unit 1522, as described supra. The delivery of the amendment contents 1563 to the pressurized container is driven by a force, such as: gravity, a pump, a timed pump, and/or a pressure differential. Optionally, delivery of the amendment contents 1563 additionally adds pressure and/or delivers a first pressure to the contents of the pressurized container 1510. For instance, the delivery of the amendment contents 1563 from a pressurized version of the amendment container 1620 is used to bring the pressure inside the pressurized container 1510 to a final shipping pressure of less than 200 psi, such as in a range of 140 to 180 psi.

Still referring to FIG. 16B, timing and flow of the amendment contents 363 is optionally and preferentially controlled and/or monitored with a flow valve. As illustrated, at the second time, $t_2$, the amendment contents 363 initially form, for a time period of less than 10 microseconds to a time period of greater than four hours, a zone that is not yet equilibrated or mixed into the liquid/semi-solid zone/high viscosity zone 340 and/or the gas zone 350. However, the amendment contents 363 mix with the liquid/high viscosity zone 340 and/or the gas zone 350 as further described, infra.

Herein, the second constituent 1564, such as THC, in the amendment contents 1563 is optionally and/or preferably in a natural form, in a purified form, in a liquid form, in a suspension, in a colloidal suspension, in a micelle, in a liposomal solution, dissolved in a solvent such as greater than 1, 2, 5, 10, 25, or 50 percent ethanol and/or greater than 1, 2, 5, 10, 25, or 50 percent butane, and/or is pre-homogenized to aid in mixing with the contents of the liquid/high viscosity zone 1540 of the pressurized container 1510. For instance, the inventors have discovered that THC dissolved in ethanol diffuses/permeates into liquid cheese to uniformly distribute the THC in the cheese product. Optionally and preferably, THC and/or THC in a solvent, such as ethanol, is a component of a formed suspension/emulsion, such as THC in water or THC in an aqueous mix, such as a beverage component. Optionally and preferably, the THC is emulsified in the water/aqueous mix along with one or more of: a surfactant, such as lecithin, an ester of glycerol, a Tween, such as Tween 20, 40, 60, or 80; a polysaccharide, such as gum Arabic, sap of an acacia tree, pectin, inulin, and/or Jujube polysaccharide; and/or a protein, such as soy protein, whey protein, pea protein isolate, and/or a gelatin.

Timing and/or volume of flow of the amendment contents 1563, which either produce directly or are used to calculate a volume of flow are additionally combined with a concentration to calculate/yield an amount of delivered product, such as milligrams of THC added to a container, such as the pressurized canister. The amount of THC is optionally digitally added to a certification report, which is optionally part of a certified and regulatory controlled chain of reports tracking THC along any portion from production, through isolation/extraction, to addition to a formulation, to distribution, and/or sale.

Example II

In a second example, referring now to FIG. 16B and FIG. 15, the amendment contents 1563 are mixed into the liquid/semi-solid zone/high viscosity zone 1540 and/or the gas zone 1550 of the final product. As illustrated in FIG. 16B, after even a short time period, such as less than 1, 30, or 60 seconds, a portion of the amendment contents 1563, such as THC dissolve and/or move into the liquid/semi-solid zone/high viscosity zone 1540. Transfer of the amendment contents 1563, such as THC, from an amendment zone into the liquid/semi-solid zone/high viscosity zone 1540 of the final product is facilitated in a number of ways, such as any of shaking, heating, and/or stirring. For instance, after addition of the amendment contents 1563 into the pressurized canister 1510 and optionally and preferably after removing all connections between the amendment container 1620 and the opening/shutting control element 1640 and the pressurized canister 1510, the pressurized canister 1510 is shaken 432 and/or heated to a temperature in excess of 25° C., such as above 30, 35, 40, 45, 50, 55, or 60° C. for a period of time, such as in excess of 1, 2, 3, 4, 5, 10, or 20 minutes. For instance, for the case of a pressurized cheese product, the heating decreases the viscosity of the cheese to form at least a layer of liquid cheese product, which facilitates natural liquid-to-liquid movement of a liquid form of the amendment contents 1563 into the liquid/high viscosity zone 1540, which results in a more homogenized or evenly distributed content of the amendment contents 1563, such as the THC, in the liquid/high viscosity zone 1540. Optionally and preferably the heating step heats to a temperature above that of a typical liquid bath sterilization step of the resultant packaged product. As the optional temperature mixing step optionally and preferably exceeds temperature and time requirements of a typical liquid bath sterilization step, the heating step optionally replaces the sterilization step. Optionally and preferably, the heating step elevates temperatures of the amended product 114 to a temperature less than a temperature at which THC degrades, as described supra.

Still referring to FIGS. 15, 16A, and 16B, the pressurized canister 1510 is optionally any type of pressurized container, such as an aerosol container where the pressure is distributed with the canister in contact, interspersed into, and/or dissolved within the food product; a valve type container, where the pressurized gas is behind a valve and force the valve to move toward a dispensing valve forcing the food product out of the container when the valve is opened; and/or is a bag-in-can type canister.

Referring now to Table 15, two sequential methods are provided, the sequential methods corresponding to sequential action of the second to fourth column of Table 2, for amending and/or finalizing a food product in a pressurized container.

TABLE 2

| Finalizing/Amending Product | | | |
|---|---|---|---|
| Case | Manufacturing Step | Subsequent Manufacturing Step | Additional Manufacturing Step |
| First Case | Open Pressure Seal | Add Product Constituent | Pressurize and Seal Product |
| Second Case | Open Pressure Seal | Add Product Constituent while Increasing Pressure | Seal Product |

Add THC to On-Site Prepared Formulation

Referring now to FIGS. 16 and 17, examples of the amend formulation 750 method of the process of amending the starting product 130 are provided. Generally, THC 210, a THC emulsion 1710, and/or the additive 200 are optionally added to any food/beverage production, even if the food/beverage production step takes place at one location, such as a licensed THC facility. However, steps described herein aid in the production, such as in terms of enhanced homogenization of THC within a food product by adding the THC emulsion to an existing food/beverage formulation process and/or substituting in the THC emulsion 1710 in place of THC 210 or a THC in oil in the formulation, as described supra. For clarity of presentation and without loss of generality, examples of amending a brownie preparation and amending a brite tank ready for canning or bottling are described, where the formulation of the brownie and/or brite tank is amended to include the THC 210 and/or the additive 200 in the form of an emulsion.

Example I

In a first example, a brownie formulation is amended. In the THC world, addition of THC to brownies is well known. However, the THC is in the form of raw/concentrated THC. Herein, amendment of a traditional formulation, such as that of a brownie, is described where the THC is added as an emulsion having specific properties, as described supra, that enhance suspension time in an aqueous solution and/or enhance homogeneity, as it is commonly known that traditional THC brownie recipes end up with a majority of the THC in a minority section of a batch of brownies.

Referring now to FIG. 17, in a process of adding THC to an on-site prepared formulation 1700, the THC emulsion 1710 is added to a beverage 1720, a food product, a cookie dough 1730, and/or a cream 1740, such as for packaging in a pressurized or non-pressurized whipped cream container.

Example II

Figure 18:
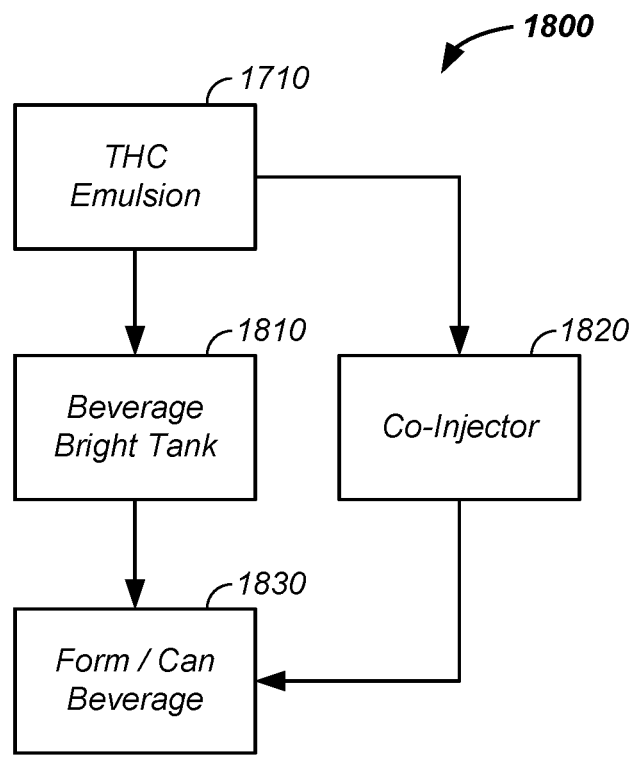
FIG. 18 illustrates adding THC to a beverage.
Figure 19:
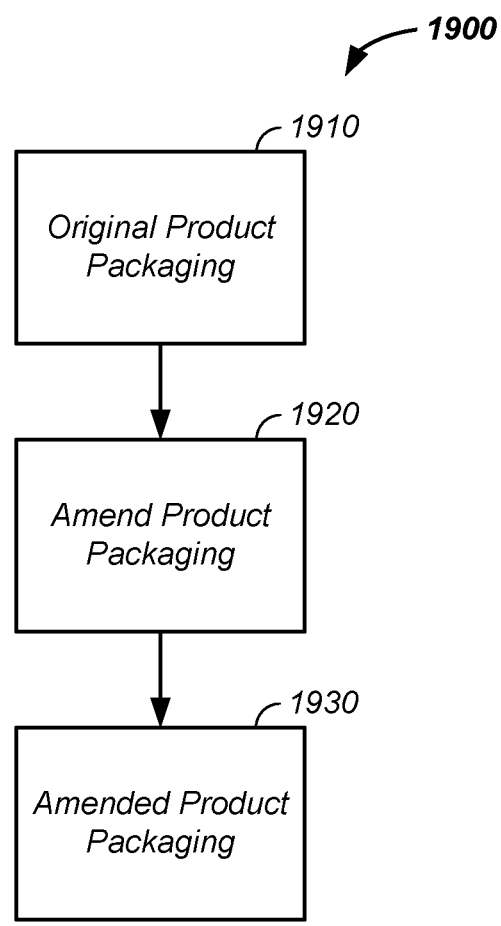
FIG. 19 illustrates amending product packaging.

In a second example, beverage components, such as in a pre-packaging state in a brite tank, are amended with THC and/or a THC emulsion, where contents of the amended brite tank are subsequently canned or bottled In this case, optionally and preferably the original product is a premixed syrup concentrate, which is mixed with water in the brite tank. Here, the amendment process introduces THC into the syrup/beverage mix and/or the brite tank container, where a resultant THC amended brite tank mix is subsequently canned or bottled. Referring now to FIG. 18, a process of canning and/or bottling 1800 optionally and preferably mixes the THC emulsion 1710 with constituents of a beverage in a brite tank 1820 and fills 1830 a can or bottle with the mixture/amended beverage. Optionally, the THC emulsion 1710 is co-injected with constituents of the beverage in the brite tank 1820 in the process of filling 1830 a can or bottle to form the now amended beverage.

In the previous two examples, or more generally in any amendment process, the THC emulsion used in an amendment process of the original product optionally and preferably has a mean THC micelle diameter, excluding micelles of less than 20 nm diameter, in a range of: less than 300 nm, 200 to 1000 nm, 300 to 700 nm, 300 to 1000 nm, 400 to 700 nm, 500 to 1500 nm, and/or 1000 to 2500 nm, where the identified micelle diameters are optionally used for any formulation described herein. The amended formulation using a THC emulsion optionally and preferably has mean THC suspension viscosities of: 1 to 15 mPa sec, 5 to 30 mPa sec, 5 to 100 mPa sec, and/or 5 to 500 mPa sec. Optionally and preferably, the THC emulsion is passed through a nozzle of less than 1, 0.5, 0.1, or 0.01 mm using an applied pressure of greater than 150, 250, 500, 1,000, or 3000 bar to generate mean micelle emulsion diameters of less than 700, 500, 300, 200, or 100 nm.

Childproofing/Adult Use

Referring now to FIGS. 19, 20, 21, 22, 23A, 23B, 24, 25, and 26 processes for protecting children from the effects of the THC and/or the nootropics are described. Generally, referring now to FIG. 19, a process of changing labeling 1800 of the original product 112 to represent the amended product 114 is described. The original product 112 may or may not have a label on it for sale. In cases where the original product 112 was labeled for sale without inclusion of THC, labeling of the original is optionally altered, changes, amended, and/or replaced to represent the amended product 114. For instance, the original product packaging 1910 is optionally and preferably amended 1920 to yield amended product packaging 1920. In some cases, the original product 112 is available for sale, but is shipped to the amendment facility already labeled to represent the amended product 114. Examples are used to further describe optional and preferably labeling changes and/or child protection devices.

Example I

Figure 23A:
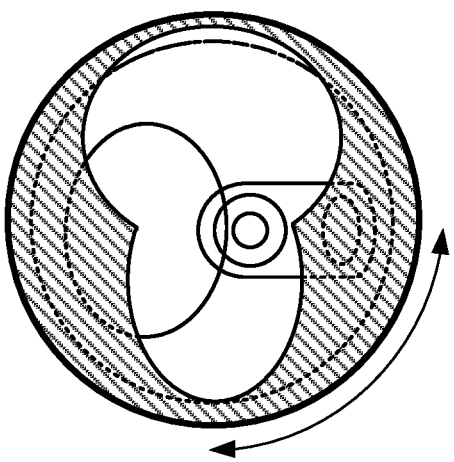
FIG. 23A and FIG. 23B illustrate a can safety lid in a safe and open orientation, respectively.
Figure 23B:
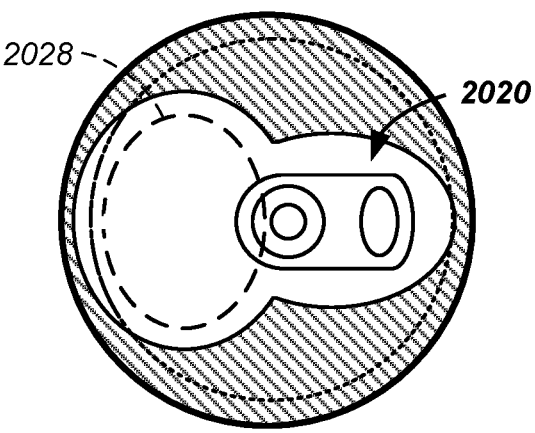
Figure 27:
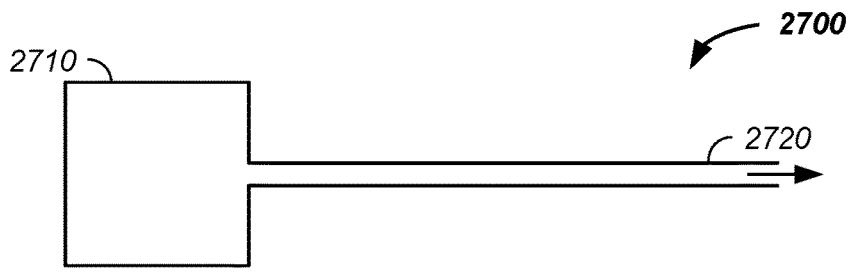
FIG. 27 illustrates an emulsion formation capillary system.
Figure 28:
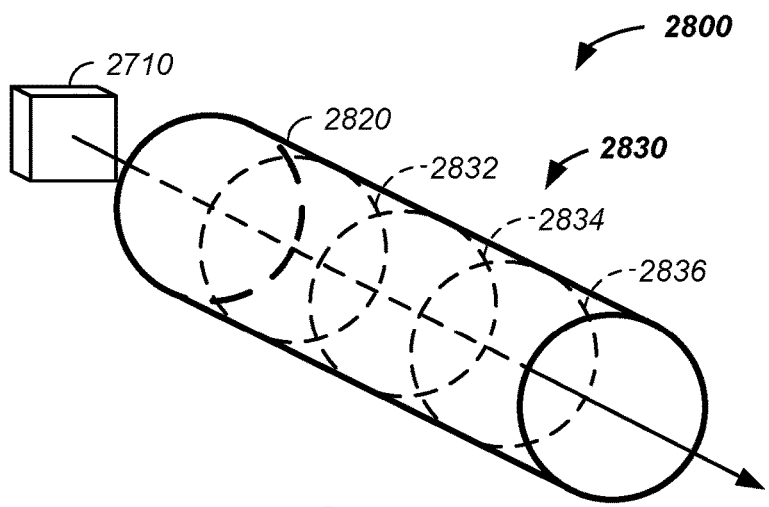
FIG. 28 illustrates a shear inducement system.
Figure 29:
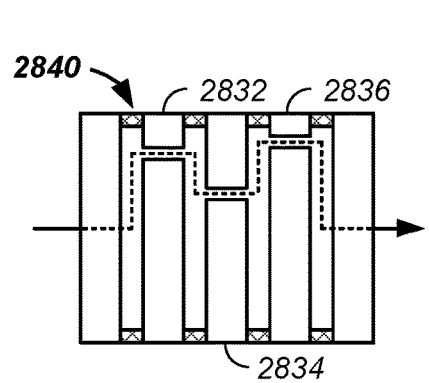
FIG. 29 illustrates separated shear plates.
Figure 30:
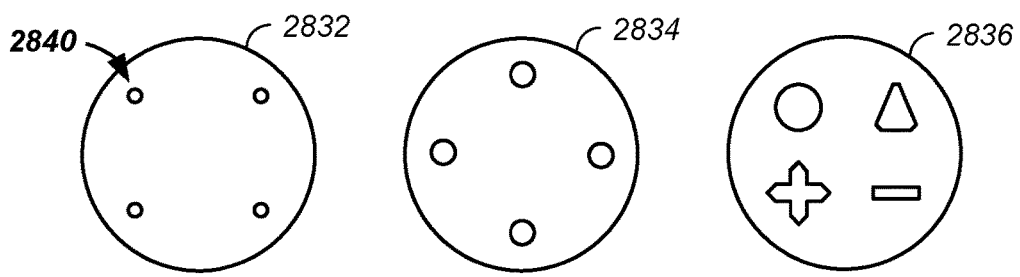
FIG. 30 illustrates shear plates.

Referring now to FIGS. 20, 21, 22, 23A, and 23B, a first example of child-proofing a THC containing can is provided. A rotatable can lid system 2000 is illustrated with a can 2010 and a rotatable cover 2200. The can 2010 and a can tab 2020 are illustrated. The can tab 2020 includes a pivot point 2022, a lever end 2024 operable by a user, and a pressure opening end 2026 that redirects the user's applied force downward to an openable portion 2028 of the can 2010. The rotatable cover 2200 contains at least two accessible zones, an opener zone 2220 and a can opening zone 2230. As illustrated in FIG. 23A, at a first time, such as at time of manufacture and distribution, the rotatable cover 2200 prevents access to the lever end 2024 of the can tab 2020 and the openable portion of the can 2028. As illustrated in FIG. 23B, at a second time such at time of use by an adult consumer, after rotation of the rotatable cover 2200, the opener zone 2220 gives access to the lever end 2024 of the can tab 2200 and the can opening zone 2230 gives access to the openable portion 2028 of the can. Thus, rotation of the rotatable cover 2200 is required to access contents of the THC containing can. Optionally and preferably, the rotatable cover 2200 clips securely over a top of the can during production.

Example II

Figure 20:
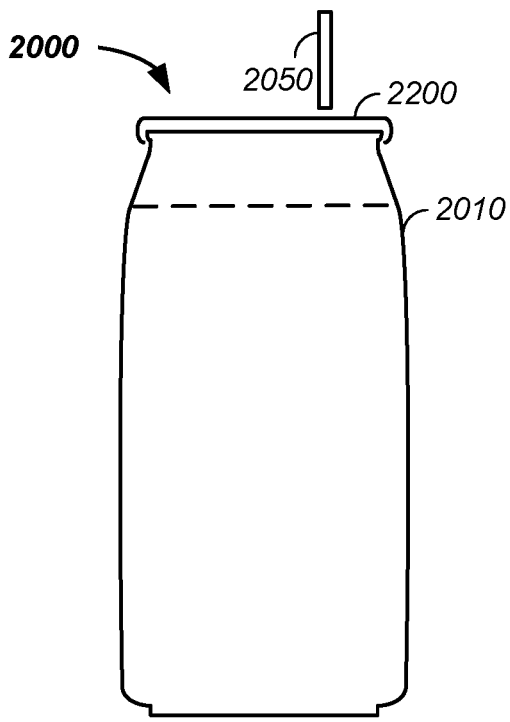
FIG. 20 illustrates a beverage can.
Figure 21:
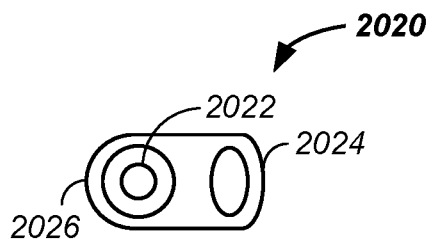
FIG. 21 illustrates a can tab.
Figure 22:
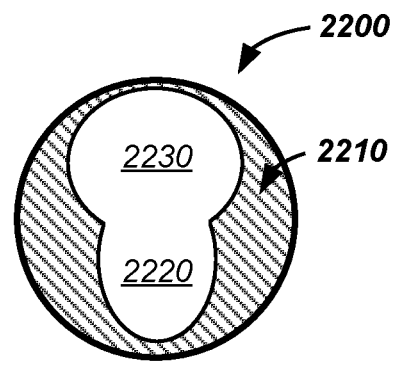
FIG. 22 illustrates a can safety lid.

Referring now to FIG. 20 and FIG. 24, a second example of child-proofing a THC containing can is provided. As illustrated in FIG. 20, at time of production the tab 2020 is rotated around the pivot point 2022 relative to an operable opening position, such as either in original assembly or with a mechanical rotator 2050 used to spin the tab 2020. As illustrated in FIG. 24, at a first time, such as at time of sale to a consumer, the can tab 2022, if operated by a consumer, fails to apply a downward force on the openable portion 2028 of the can 2010. At a second time, such as after the consumer rotates the can tab 2020 around the pivot point 2022, the can tab 2020 is orientated in a traditional position and functions to open the can 2010 when the user levers up the can tab 2020 relative to a top 2020 of the can 2010. Optionally, the tab opener of a canned beverage is rotated from a non-opening position, such as rotated 180 degrees in the x/y-plane, to an opening position, where the z-axis aligns with gravity when the can is sitting upright. Thus, rotation of the can tab 2020 is required to access contents of the THC containing can.

Example III

Referring now to FIG. 25, the can 2010 optionally and preferable contains an adult use labeling zone 2510 near the top 2020 of the can. For instance, optional packaging labeling to represent the amended product 114 includes one or more of: adding a "for adult use only" label, color coding a section of the label, where the color coding indicates to a trained consumer that the product is for adult use, color coding a particular section of a container, such as the labeling zone 2510, a top ½ inch, a top ¾ inch, and/or a top 1 inch plus-minus ⅛ inch sections of the listed sections, color coding a section of the packaging, such as the labeling zone 2510 and/or an upper portion of a beverage container, such as with a green, bright green, orange, bright orange, yellow, or bright yellow label, where the color coded warning section is optionally labeled with wording indicating that the product is for adult use, contains THC, and/or a combination of the above. Referring now to FIG. 26, optionally, additional packaging, such as a seal 2610, is added to the original packaging, such as to a bottle 2600, as a child-proof opening constraint, an adult-use only labeled wrap about at least an opening portion of a can/bottle, and/or a color coded label as described supra.

Example IV

Optionally, a beverage containing THC is packaged into a can with a resealable lid, such as provided by Sip N Shut (SNS Tech, Austin Tex.), Xolution (XOLUTION GmbH, Germany), and/or Heat Genie (Austin, Tex.).

Emulsion Formation

Referring now to FIGS. 27-30, examples of the high-pressure homogenizer 668 are provided.

Example I

In a first example, a first high pressure emulsifier 2700 is illustrated. Generally, a pump 2710 pumps an emulsion, such as prepared by the mixer 662 through a tube/open ended container 2720, such as a capillary tube. Shear forces in the tube break down the emulsion particles into smaller volumes/micelles. For example, the rotator-stator mixer forms micelles in a range of 1000 to 2500 nm in diameter, which are broken down by high shear forces in the high pressure emulsifier to mean diameters of less than 700, 500, 300, or 200 nm, as described supra. The shear forces in the first high pressure emulsifier are optionally and preferably greater than 100,000, 1,000,000, 5,000,000, or 10,000,000 inverse seconds. For a straight tube, the shear forces are provide by equation 1, $$\Delta P = (v \cdot s \cdot l)/(4 \cdot 1000 \cdot d) \quad \text{(eq. 1)}$$

where P=pressure in Pascals, v=viscosity in mPa sec, s=shear rate in inverse seconds, l=length in millimeters, and d=diameter in millimeters.

Example II

In a second example, a second high pressure emulsifier 2800 is illustrated. In this example, the high pressure pump 2710, such as a greater than 2000, 3000, 4000, or 5000 p.s.i. pump, forces the emulsion, such as THC, water, and lecithin, through a container 2830, where the container contains a set of emulsion/shear plates 2830 separated by a set of spacers 2840. For instance, the high pressure pump 2710 forces the emulsion through holes/openings in a first shear plate 2832, then through a second shear plate 2834, then through a third shear plate 2836, . . . , and finally through an $n^{th}$ shear plate, where n is a positive integer of greater than 0, 1, 2, 3, 4, 5, 6, 8, 10, 15, 20, 40, 80, or 100. Optionally and preferably, holes in subsequent shear plates are not aligned, resultant in a tortuous path of the emulsion both between plates and through plates where: (1) the close distances between plates, such as less than 50, 10, 5, 2, 1, 0.5, 0.1, 0.01, or 0.001 mm, result in shear forces between plates and/or (2) narrow mean openings/holes through each shear plate, such as less than 20, 10, 5, 2, 1, 0.5, 0.1, 0.01, or 0.001 mm, result in shear forces through plates to yield a preferred shear force of the system on the emulsion, which yields the preferred stable and/or transparent emulsion with mean particle sizes of less than 1000, 750, 500, 300, 200, or 100 nm. As illustrated, the openings 2840/holes through the shear plates are optionally of any size and/or geometric shape. However, larger perimeter to diameter ratios are preferred due to an increase in exerted shear forces, such as produced by a circle, triangle, rectangle, polygon, or the illustrated cross shape, which comprising indentations (tabs) into and cutouts around a circle shape.

Still yet another embodiment includes any combination and/or permutation of any of the elements described herein.

Herein, a set of fixed numbers, such as 1, 2, 3, 4, 5, 10, or 20 optionally means at least any number in the set of fixed number and/or less than any number in the set of fixed numbers.

Herein, any number optionally includes a range of numbers such as the number, n, ±1, 2, 3, 4, 5, 10, 20, 25, 50, or 100% of that number.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus.

Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for forming a stable tetrahydrocannabinol beverage, comprising the steps of:
preparing a beverage in a container, the beverage ready for packaging;
forming a tetrahydrocannabinol (THC) emulsion with a rotor-stator mixer to form a first intermediate emulsion;
processing the first intermediate emulsion with an ultrasonic mixer;
processing an output of said ultrasonic mixer with a microfluidizer to reduce a mean particle diameter to a range of 300 to 800 nm by forcing the emulsion through a nozzle with a pressure exceeding 150 bar;
combining the tetrahydrocannabinol (THC) emulsion with the beverage to form an amended beverage, said THC emulsion comprising: the mean micelle diameter size of three hundred to eight hundred nanometers and a viscosity of less than two hundred mPa-sec; and
packaging the beverage and the THC emulsion in is at least one of a can and a bottle.

2. The method of claim 1, further comprising the step of:
forming nano particle sized micelles of the tetrahydrocannabinol and an emulsifier by passing the emulsion through a nozzle comprising a diameter of less than one millimeter, said nano particle sized micelles comprising a mean particle diameter of 400 to 700 nm.

3. The method of claim 2, the method of forming further comprising the step of:
spraying the emulsion directly into a container within two seconds of addition of said beverage to said container, said container comprising a volume of less than twenty-five ounces, said container comprising at least one of said can and said bottle.

4. The method of claim 1, further comprising the step of:
applying a shear rate to said emulsion of greater than 100,000 reciprocal seconds.

5. The method of claim 1, further comprising the step of:
prior to said step of forcing, mixing together said emulsion and a psychoactive mushroom with a rotator-stator mixer and subsequently passing said emulsion through a microfluidizer, wherein a furthest extension point of a rotator of said mixer comprises a separation from a stator of said mixer of less than one millimeter.

6. The method of claim 4, said step of combining further comprising the step of:
forming a beverage solution comprising a mean particle size of 400 to 700 nm that widens a red laser beam by less than three hundred percent at a full width half height, as measured by transmittance intensity along an axis perpendicular to the red laser beam, over a pathlength of ten millimeters.

7. The method of claim 1, further comprising the step of:
combining a commercially available soda syrup and said emulsion in a brite tank container of at least ten gallons, said brite tank container containing a beverage solution ready for packaging the beverage in at least one of a sealed can and a sealed bottle.

8. The method of claim 1, further comprising the step of:
combining a commercially available soda syrup, said emulsion, and at least one nootropic to form a beverage ready for packaging in a sealed container, said nootropic comprising at least one of: a barbiturate and a hallucinogen.

9. The method of claim 1, said step of combining further comprising the step of:
adding kava kava, a mushroom, and a pine bark extract to said beverage.

10. The method of claim 1, further comprising the steps of:
receiving an original product in a first pressurized container;
breaking a pressure seal of said first pressurized container;
adding the tetrahydrocannabinol emulsion to said first pressurized container after said step of breaking said pressure seal; and
resealing said first pressurized container, said first pressurized container containing the beverage.

11. The method of claim 1, further comprising the step of:
receiving into a second geographic zone a syrup concentrate from a first geographic zone, wherein packaging greater than three milligrams per serving of tetrahydrocannabinol (THC) in the food product is: (1) illegal in the first geographic zone and (2) legal in the second geographic zone;
forming said beverage with said syrup concentrate; and
injecting the beverage with said tetrahydrocannabinol emulsion to form an amended food product.

12. The method of claim 1, said step or packaging further comprising the step of:
clipping a rotatable cover to said can; and
requiring rotation of said rotatable cover to position an opening of said rotatable cover over an openable portion of said can requiring rotation of said rotatable cover prior to a tab opener of said can being accessible for opening said can.

13. The method of claim 1, further comprising the step of:
applying a shear rate in excess of 1,000,000 reciprocal seconds to said THC emulsion comprising prior to said step of combining.

14. The method of claim 13, further comprising the step of:
forming said THC emulsion with a rotator-stator mixer prior to said step of applying.

15. The method of claim 1, further comprising the steps of:
receiving said beverage in said container into a second geographic zone where packaging THC is legal from a first geographic zone where packaging THC is illegal;
opening said container within said second geographic zone, said step of combining occurring in said second geographic zone to form an amended product;
canning the beverage and the THC emulsion in said can, said can comprising a resealable opening; and
distributing said amended product for sale.

* * * * *